(12) United States Patent
Funo et al.

(10) Patent No.: US 7,725,994 B2
(45) Date of Patent: Jun. 1, 2010

(54) BUCKLE, INJECTION MOLDING DIE AND INJECTION MOLDING METHOD

(75) Inventors: Yasuaki Funo, Kurobe (JP); Yasutaka Nishida, Tokyo (JP); Toshihiko Iwasaki, Kurobe (JP)

(73) Assignee: YKK Corporation, Tokyo (JP)

( * ) Notice: Subject to any disclaimer, the term of this patent is extended or adjusted under 35 U.S.C. 154(b) by 193 days.

(21) Appl. No.: 11/339,767

(22) Filed: Jan. 25, 2006

(65) Prior Publication Data

US 2006/0172038 A1   Aug. 3, 2006

(30) Foreign Application Priority Data

Jan. 28, 2005   (JP)   ............................. 2005-022175
Feb. 25, 2005   (JP)   ............................. 2005-051555
Apr. 7, 2005    (JP)   ............................. 2005-111115

(51) Int. Cl.
    *A44B 11/25*   (2006.01)
(52) U.S. Cl. ...................................... 24/625
(58) Field of Classification Search ........... 24/614–616, 24/625
    See application file for complete search history.

(56) References Cited

U.S. PATENT DOCUMENTS

| 495,971 | A | | 4/1893 | Harris |
|---|---|---|---|---|
| 4,633,549 | A | | 1/1987 | Lovato |
| 5,311,649 | A | * | 5/1994 | Suh ............................. 24/625 |
| 5,440,792 | A | * | 8/1995 | Ida ............................... 24/615 |
| 6,351,876 | B1 | * | 3/2002 | Uehara ........................ 24/625 |
| D496,304 | S | | 9/2004 | Uehara et al. |
| 2004/0025310 | A1 | * | 2/2004 | Uehara et al. ................. 24/615 |
| 2005/0042911 | A1 | * | 2/2005 | Koenig et al. ................ 439/357 |

FOREIGN PATENT DOCUMENTS

| EP | 0815761 | 1/1998 |
|---|---|---|
| EP | 1052735 | 11/2000 |
| EP | 1166674 | 6/2001 |
| EP | 1166674 | 1/2002 |
| JP | A-S61-041404 | 2/1986 |
| JP | 04-84581 | 7/1992 |
| JP | 4-221502 A | 8/1992 |

(Continued)

OTHER PUBLICATIONS

Office Action for Japanese Application No. 2005-111115 dated Sep. 8, 2009.

(Continued)

*Primary Examiner*—James R Brittain
(74) *Attorney, Agent, or Firm*—Alston & Bird, LLP

(57) ABSTRACT

A plug (20) has a guide bar (24) to be inserter in a socket (30). The guide bar (24) has a to-be-held section (241) at a tip end thereof, a dent (244) at a middle portion thereof, and a sub to-be-held section (242) at a base end thereof. When making an engagement, the plug (20) is slanted relative to the socket (30), so that the guide bar (24) contacts contact points (P1, P2). When the plug has been inserted into a depth end of the socket, the to-be-held section (241) and the sub to-be-held section (242) are held by a holding section (342) and a sub holding section (343) of the socket (30), thereby stabilizing engagement posture.

16 Claims, 17 Drawing Sheets

FOREIGN PATENT DOCUMENTS

| | | |
|---|---|---|
| JP | 04-226714 A | 8/1992 |
| JP | 07-016890 A | 1/1995 |
| JP | U-H07-009113 | 2/1995 |
| JP | 08-103304 | 4/1996 |
| JP | 09-155930 A | 6/1997 |
| JP | 09-155937 A | 6/1997 |
| JP | 09-300362 | 11/1997 |
| JP | 10-057114 | 3/1998 |
| JP | 2000-000105 | 1/2000 |
| JP | A-2000-316610 | 11/2000 |
| JP | 2003-266485 A | 9/2003 |
| JP | 2003-299519 | 10/2003 |
| JP | 2003284606 A * | 10/2003 |
| JP | 2003-311791 | 11/2003 |
| JP | 3494588 | 11/2003 |
| JP | 2004-329736 | 11/2004 |

OTHER PUBLICATIONS

Office Action for German Patent Application No. 102006003588.7 dated Oct. 14, 2009.

* cited by examiner

BUCKLE, INJECTION MOLDING DIE AND INJECTION MOLDING METHOD

BACKGROUND OF THE INVENTION

1. Field of the Invention

The present invention relates to a buckle for securely fastening, for example, a belt, a tape or a string; an injection molding die; and an injection molding method, specifically to a manufacturing die for a plastic molding article having an undercut.

2. Description of Related Art

Fastening by a strip-shaped material such as a belt and a tape is often used in garments, bags, helmets, baby carriages, sporting goods and the like. In the fastening, a buckle that is attached to, for example, a belt and can be manually locked/unlocked is used.

Typically, the buckle has a plug (male member) and a socket (female member) and is locked by inserting the plug in the socket to a certain state.

Such typical buckle consists of the socket having a cylindrical shape; the plug to be inserted in the socket; and a lock mechanism for holding the socket and the plug in engagement.

The socket has a belt-holding part, or an attachment part to be fixed to a sheet and the like; and an insertion opening defined on a plug side.

The plug has a belt-holding part on one end; and a pair of lock arms on the other end, the lock arms extending in a direction to be engaged with the socket.

The lock arm is made of a flexible material and provided with an step-like engaging part in an outer surface thereof so as to be engageable with an inner surface of the socket.

The socket is provided with operation openings in both lateral surfaces thereof, which are for operating the lock arms from outside to release the engagement. A peripheral portion of the operation opening is used as an engaging part inside the socket, as stated above.

With this structure, when the plug is inserted in the socket, the lock arms are engaged with the inner surface of the socket to establish the engagement of the buckle. From this engagement state, the engagement between the pair of lock arms and the inner surfaces of the socket can be released by pinching the lock arms of the plug with fingers to press the lock arms inward, thereby easily dissolving the engagement of the buckle. Such type of buckle is called a side-release buckle, a side-push buckle or the like.

A buckle disclosed in the document 1 (Japanese Utility Model Publication No. 4-84581) has the operation opening defined in part of a surface, so that the engagement thereof can be released by pressing the lock arm of the plug through the opening.

Since this type of buckle can be released only by the pressing, the dissolving operation is simple. However, a user should be careful, as the buckle can be unintentionally released by error.

In a buckle disclosed in the document 2 (Japanese Patent Laid-Open Publication No. 2003-299519), the socket has the operation openings defined in both lateral surfaces thereof, and the plug has the pair of lock arms. Accordingly, the engagement of the buckle can be released by pinching the lock arms of the plug from the lateral sides.

This type of buckle requires the pinching operation on the pair of lock arms, thereby preventing an erroneous operation thereon.

In these buckles, a step face of the engaging part of the lock arm is a slant surface slanted toward the side opposite to an inserting direction as becoming closer to a tip end thereof, while a step face of the engaging portion of the socket is a slant surface slanted toward the inserting direction as becoming closer to a tip end thereof. Due to the slant, the engaging parts are displaced so as to more firmly engage with each other when the plug and the socket in engagement are pulled apart in a release direction, thereby preventing the plug from being pulled out of a socket (see, for example, the document 3: Japanese Patent Laid-Open Publication No. H10-57114).

The above described buckle is used not only for coupling belt ends, but also as a sheet attachment buckle for fixing a belt on an upper surface of an article or for closing a flap to cover an opening of a bag.

In such sheet attachment buckle, the socket or the plug is disposed on the upper side of the sheet, and an attachment member is disposed on a rear side of the sheet. The sheet is sandwiched by fixing the attachment member to the socket or the plug (see, for example, the document 4: Japanese Patent Laid-Open Publication No. 2004-329723).

In the above described sheet attachment buckle, the lock arms may be pressed on the sheet (in a second direction) when pinching the lock arms to release the engagement, the sheet being the article to which the buckle is attached.

Also in the buckle for coupling the belt ends, when handling with one hand, the buckle may be pressed on an upper side of another article during the pinching operation on both lateral surfaces.

To help the release operation including the pressing i.e. the operation in a first direction including the movement in the second direction, a buckle is manufactured such that the middle portion of the lock arm has a cross section with a slant intersecting both of the first direction and the second direction (see, for example, the document 5: Japanese Patent Publication No. 3494588).

When the above described sheet attachment buckle is used for a bag and the like, the socket may be disposed along the upper surface of the bag, so that the plug may often be inserted aslant in the socket. In order to stabilize the insert with a slant, the buckle having a guide bar is produced.

A buckle disclosed in the document 6 (U.S. Pat. No. 495,971) has the lock arm and the guide bar to facilitate the insertion of the plug in the socket. With the guide bar, the socket can be smoothly inserted by placing the guide bar at the opening of the socket while slanting the plug relative to the socket and moving the guide bar along the axial direction.

A plastic molding article such as the buckle is manufactured by injection molding.

In a typical injection molding, a movable die is moved to and closes with a fixed die, molten synthetic resin material is molded in a cavity, and the movable die is opened to remove the molding article.

In such typical injection molding, a concave or a convex in the molding article can be easily formed in an opening/closing direction of the die, but a concave or a convex (undercut) in a direction intersecting the opening/closing direction is difficult to form. This is because the undercut can be interfered when opening the die, interfering with a smooth removal of the molding article.

To solve this problem, a die is provided with a slide core that is advanceable and retractable to the fixed die or the movable die in order to form the undercut with the slide core (see, for example, the document 7: Japanese Patent Publication No. 2003-311791 and the document 8: No. H9-300362).

In the buckle of the document 5, to handle the operation in the first direction including the operation in the second direction and to obtain the pull-out prevention effect due to the slant, the engaging part of the lock mechanism of the lock arm or the socket employs two hook surfaces corresponding to the first and second directions.

Specifically, a first hook surface is provided to a portion near the front and rear surfaces of the socket out of the peripheral of the operation opening of the socket, while a second hook surface is provided to a portion near the lateral surfaces of the socket.

The two hook surfaces are formed in directions orthogonal to each other. A slant similar to the slant of the document 3 is formed to obtain the pull-out prevention effect in the first and second directions.

In the arrangement in which the two hook surfaces have a slant in the first direction and second direction, it has been desired to improve engaging force of the engaging portion and to achieve a smooth and easy operation even in the release operation including the pressing.

The guide bar of the document 6 has the front and rear surface recessed in the middle portion in an arc shape (a direction of the thickness of the buckle), so that the middle portion is prevented from interfering with the opening of the socket even when the plug is inserted aslant relative to the socket.

However, the guide bar with the middle portion being recessed slidably contact the inner surface of the socket only at a tip end of the guide bar, there has been desired an arrangement that can more reliably provide the stability in the postures of the socket and the plug in engagement.

In the documents 7 and 8, the slide core projecting in the cavity is used. The slide core forms the undercut of the molding article. Hence, the slide core is arranged to be advanced and retracted along the longitudinal direction, and the advanceable and retractable directions are limited to the depth direction of the undercut.

Since the direction of the slide core is limited as stated above, a drive mechanism of the slide core cannot be simplified, and it is difficult to dispose the slide core when the molding article has a part facing the undercut.

SUMMARY OF THE INVENTION

An object of the present invention is to provide: a buckle that can be handled smoothly and easily even in a release operation requiring pressing operation and a slant inserting operation of the buckle; an injection molding die; an injection method, the injection molding die and method being capable of forming a variety of undercuts with a simplified structure.

A buckle (10) of the invention includes: a plug (20); a socket (30); and a lock mechanism (13) for maintaining the plug (20) and the socket (30) in engagement in a releasable manner. The lock mechanism (13) has: an arm-side lock member formed on a lock arm of the plug (20); and a socket-side lock member formed on the socket (30). At least one of the arm-side lock member and the socket-side lock member is a slant surface to contact the other. The slant surface is slanted from a front side to a rear side of the plug (20) or the socket (30).

According to the aspect of the invention, the arm-side lock member and the socket-side lock member of the lock mechanism are coupled with each other in the engagement state, and the engagement can be released by elastically deforming the lock arm. One of the arm-side lock member and the socket-side lock member is arranged to be the slant surface slanted from the front side to the rear side thereof. When a force separating the plug and the socket from each other is applied in the engagement direction, the arm-side lock member and the socket-side lock member are relatively displaced in the slanting direction. Hence, the lock state can be extremely strong.

On the other hand, when dissolving the lock state, the arm-side lock member and the socket-side lock member can be moved along the slant surfaces by pressing the pair of lock arms from the front side toward the rear side. Thereby, the lock state can be smoothly released.

A buckle of the invention includes: a plug (20); a socket (30), the plug (20) and the socket (30) being engaged in a predetermined engagement direction; and a lock mechanism (13) for maintaining the plug (20) and the socket (30) in engagement in a releasable manner. The plug (20) and the socket (30) have: a first direction (D1) intersecting the engagement direction (DC); and a second direction (D2) intersecting both of the engagement direction (DC) and the first direction (D1). The socket (30) has: an insertion opening (33); and a cavity (34) extending from the insertion opening (33) toward inside of the socket (30). The plug (20) has a lock arm (23). The lock mechanism (13) has: an arm-side lock member (233) formed on the lock arm (23); and a socket-side lock member (351) formed on the socket (30). At least one of the arm-side lock member (233) and the socket-side lock member (351) is a slant surface (233, 351) contactable with the other. The slant surface (233, 351) has: a back side in the engagement direction (DC) continuous with an outer surface of the socket (30); and a front side in the engagement direction (DC) positioned inside the socket (30). The slant surface (233, 351) is slanted relative to any of the engagement direction (DC), the first direction (D1) and the second direction (D2).

According to the aspect of the invention, the arm-side lock member and the socket-side lock member of the lock mechanism are coupled with each other in the engagement state, and the engagement can be released by elastically deforming the lock arm.

The arm-side lock member and the socket-side lock member are arranged to relatively slide on the slant surface thereof slanted in the three directions. When a force separating the plug and the socket from each other is applied in the engagement direction, the arm-side lock member and the socket-side lock member are respectively displaced in the first direction and the second direction. Hence, the lock state can be extremely strong.

On the other hand, when dissolving the lock state, the arm-side lock member and the socket-side lock member can be moved along the slant surfaces by pressing the pair of lock arms in the second direction while moving closer to each other in the first direction. Thereby, the lock state can be smoothly released.

The engagement direction, the first direction and the second direction may be perpendicular to each other or may have an angle other than 90 degrees.

According to the buckle of the invention, the slant surface (351) may preferably be formed on the socket-side lock member. A front periphery of the slant surface (351) in the engagement direction (DC) may preferably have an inner portion and an outer portion on the socket (30), the inner portion being positioned forward in the engagement direction (DC) relative to the outer portion.

According to the buckle of the invention, the slant surface (233) may preferably be formed on the arm-side lock member (233). A rear periphery of the slant surface (233) in the engagement direction (DC) may preferably have an inner portion and an outer portion on the plug (20). The inner portion may preferably be positioned forward in the engagement direction relative to the outer portion.

According to the aspects of the invention, one of or both of the arm-side lock member and the socket-side lock member are the slant surfaces, so that the arm-side lock member and the socket-side lock member can be relatively moved along the slant surfaces.

Only one of the arm-side lock member and the socket-side lock member is the slant surface and the other may have another shape to contact with each other. However, when both are the predetermined surfaces, the contact area can be wide, thereby preventing concentrated load for smooth operation.

According to the buckle of the invention, the socket (30) may preferably have an operation opening (35). The socket-side lock member (351) may preferably be formed on a peripheral of the operation opening (35). The lock arm may preferably have near a tip end thereof an operating section to be exposed through the operation opening (35). The operating section may preferably have a step face on a plug side. The step face may preferably form the arm-side lock member. The lock arm may preferably have near a tip end thereof an operating section to be exposed through the operation opening (35). The operating section may preferably have a step face on a plug side. The step face may preferably form the arm-side lock member.

The aspect enables the simple structure and the reliable operation.

According to the buckle of the invention, the socket and the plug respectively may preferably have a front surface and a rear surface opposing in the second direction and a pair of lateral surfaces opposing in the first direction. The socket may preferably have the operation opening on the lateral surfaces and the operation opening extending in to the front surface. The lock arm may preferably have an operating section exposed through the operation opening. The operating section may preferably be operable from the outside in the first direction to be close to an other lock arm and in the second direction from the front surface to the rear surface.

According to the aspect, the buckle can have a flat shape, which is most suitable for the use with a belt, and the position of the operation opening can be suitable for the operation in the first direction including the pressing in the second direction.

A buckle (10) of the invention includes: a plug (20); and a socket (30). The plug (20) and the socket (30) are engageable with and releasable from each other. The plug (20) has a guide bar (24) to be inserted in the socket (30). The guide bar (24) has: an abutting section (241, 242) to be in slidable contact with the socket (30); and a non-abutting section (244) not to be in slidable contact with the socket (30).

According to the aspect of the invention, the plug is inserted aslant in the socket for engagement. Hence, the guide bar contacts the socket at the abutting section to stabilize the posture thereof, while the non-abutting section prevents an interference with the socket.

Thus, the guide bar is held in a predetermined posture relative to the socket, thereby providing sufficiently precise guiding in the insertion as well as appropriate posture in the engagement.

When dissolving the engagement, the to-be-held section is pulled out from the holding section as the guide bar is pulled out, thereby dissolving the holding state between the holding section and the to-be-held section to make enough clearance to the socket side. Hence, the plug can be easily pulled out while slanting the plug and socket.

According to the invention, the abutting section may preferably be a to-be-held section (241) and a sub to-be-held section (242) that are formed on the guide bar (24).

According to the aspect of the invention, the plurality of abutting sections (the to-be-held section and the sub to-be-held section) can enhance the stability of posture.

To enhance the stability of posture, the to-be-held section and the sub to-be-held section are preferably positioned apart from each other such as at the tip end and the base end of the guide bar.

According to the invention, the abutting section may preferably be a dent (244) formed between the to-be-held section (241) and the sub to-be-held section (244).

According to the aspect of the invention, the intermediate portion of the to-be-held section and the sub to-be-held section can be prevented from interfering with the socket, thereby enhancing the operability in the insertion and the release.

According to the invention, the socket (30) may preferably have: a holding section (342) that sandwiches and holds the to-be-held section (241); and a sub holding section (343) that sandwiches and holds the sub to-be-held section (242).

According to the aspect of the invention, the to-be-held section and the sub to-be-held section are respectively held by the holding section and the sub holding section, thereby enhancing the stability of posture of the socket and the plug in engagement.

According to the invention, the socket (30) may preferably have: a cavity (34); and the operation opening (35) in communication with the cavity (34). The plug may preferably have a lock arm (23) that can be inserted in the cavity (34) to be partially exposed through the operation opening (35) and engaged with an engaging section (351) of the operation opening (35). The lock arm (23) may preferably be unlockable through the engaging section (351) by being pressed aslant downward through the operation opening (35).

According to the aspect of the invention, the engagement by the lock arm is released by the operation made in the slant downward direction, thereby preventing an erroneous operation while facilitating the operation.

The downward direction means a direction from the rear side to the front side, and the slant operation means that the operation is conducted in this slant direction. When a pair of lock arms are provided and the engagement is released by pinching the pair of lock arms, the release direction may be preferably slanted from this pinching direction toward the direction from the front side to the rear side.

According to the invention, the plug (20) may preferably be inserted in the socket (30). The guide bar (24) may preferably contact a cavity (34) at a contact point (P2) near an opening section of the cavity (34). The plug (20) may preferably be moved along an axial direction thereof simultaneously with moving toward a front surface of the socket (30).

According to the aspect of the invention, even when the plug is aslant inserted in the socket, the two contact points guide the plug into an appropriate posture for engagement.

According to the invention, when the plug (20) is inserted in the socket (30), the guide bar (24) may preferably contact a cavity (34) at a contact point (P1) inside the cavity (34) and a contact point (P2) near an opening section of the cavity (34). The plug (20) may preferably be moved along an axial direction thereof simultaneously with moving toward a front surface of the socket (30).

According to the aspect of the invention, even when the plug is aslant inserted in the socket, the contact point guides the plug into an appropriate posture for engagement.

According to the buckle of the invention, preferably, the plug and the socket respectively have an attachment for holding a tape object.

According to the aspect, the buckle suitable for engaging belts can be obtained.

According to the buckle of the invention, the plug may preferably have an attachment for holding a tape object. The socket may preferably have an attachment to be fixed on a surface of another article.

According to the aspect, the buckle suitable for being attached on the surface of garments, bags and the like can be obtained.

An injection molding die of the invention includes: a fixed die and a movable die that form a molding cavity when the fixed die and the movable die are closed; a slide core provided in the cavity in an advanceable and retractable manner; and a displacement mechanism for displacing the slide core in a depth direction of the undercut. The slide core forms an undercut on a molding article molded in the cavity.

According to the aspect of the invention, the slide core is displaced in the depth direction of the undercut by the displacement mechanism. Specifically, the slice core is displaced in the depth direction of the undercut in the closing state, while being displaced to the outside of the undercut (the opposite direction of the depth direction) in the opening state. Hence, the slide core can form the molding surface for molding the predetermined undercut in the cavity in the closing state, while the slide core can be removed from the undercut in the opening state so as not to interfere with the removal of the molding article.

Since the slide core of the invention is displaced in the depth direction of the undercut by the displacement mechanism, the advancement direction of the slide core is not limited to the depth direction of the undercut. Hence, the slide core in the advancement and retraction can be actuated together with, for example, the die-closing mechanism or the ejector mechanism, thereby simplifying the drive mechanism of the slide core. Even when the molding article has a part facing the undercut, the slide core and the advancement and retraction directions can be freely disposed, provided that the displacement mechanism has a displacement range.

According to the injection molding die of the invention, the slide core may preferably be advanceable and retractable in a direction in which the fixed die and the movable die are closed.

According to the aspect of the invention, the die-closing operation can be used for the advancement and retraction of the slice core, thereby simplifying the drive mechanism of the slide core.

According to the injection molding die of the invention, one of the fixed die and the movable die may preferably have an ejector pin. The slide core may preferably be advanced and retracted synchronously with the ejector pin.

According to the aspect of the invention, the drive mechanism for the ejector pin can be used for the advancement and retraction of the slice core, thereby simplifying the drive mechanism of the slide core.

According to the injection molding die of the invention, preferably, the displacement mechanism includes: a guide sleeve formed on one of the fixed die and the movable die to guide an advancement and retraction of the slide core, the guide sleeve being in slidable contact with the slide core; and a cam shape slanted relative to the advancing and retracting direction of the slide core, the cam shape being formed on one of the guide sleeve and the slide core where the guide sleeve and the slide core are in sliceable contact.

According to the aspect of the invention, the advancement and retraction movement of the slide core can be used as the displacement mechanism for displacing the slide core, so that the displacement mechanism needs not to have a dedicated driving source.

However, the aspect of the invention does not inhibit the slide core to be provided with a dedicated displacement mechanism using a hydraulic device or a motor.

According to the invention, the slide core may preferably have a molding surface for forming the undercut near a tip end thereof. Only the molding surface of the slide core may preferably be exposed in the cavity when the fixed and movable dies are closed.

According to the aspect of the invention, the slide core can be set in a free posture regardless of the undercut, so that the advancement and retraction direction of the slide core and the depth direction of the undercut can be individually set.

An injection molding method of the invention includes the steps of: providing an injection molding die having a fixed die and a movable die that form a molding cavity when the fixed die and the movable die are closed; a slide core provided in the cavity in an advanceable and retractable manner, the slide core forming an undercut on a molding article molded in the cavity; and a displacement mechanism for displacing the slide core in a depth direction of the undercut; closing the fixed die and the movable die to form the molding cavity; injecting a molten resin into the molding cavity; opening the fixed die and the movable die after the molten resin is solidified; and ejecting the molding article by advancing the slide core and displacing the slide core in the depth direction of the undercut by the displacement mechanism.

According to the aspect of the invention, the same advantages as the injection molding die as stated above can be obtained.

According to the injection molding method of the invention, the slide core may preferably be advanced and retracted in the closing direction of the fixed die and the movable die.

According to the injection molding method of the invention, one of the fixed die and the movable die may preferably be provided with the ejector pin. The slide core may preferably be advanced synchronously with the ejector pin.

According to the injection molding method of the invention, the slide core may preferably have a molding surface for forming the undercut near a tip end thereof. Only the molding surface of the slide core may preferably be exposed in the cavity when the fixed and movable dies are closed.

According to the aspects of the invention, the same advantages as the injection molding die as stated above can be obtained.

DETAILED DESCRIPTION OF PREFERRED EMBODIMENT(S)

Embodiments of the present invention will be described below with reference to the attached drawings.

Figure 1:
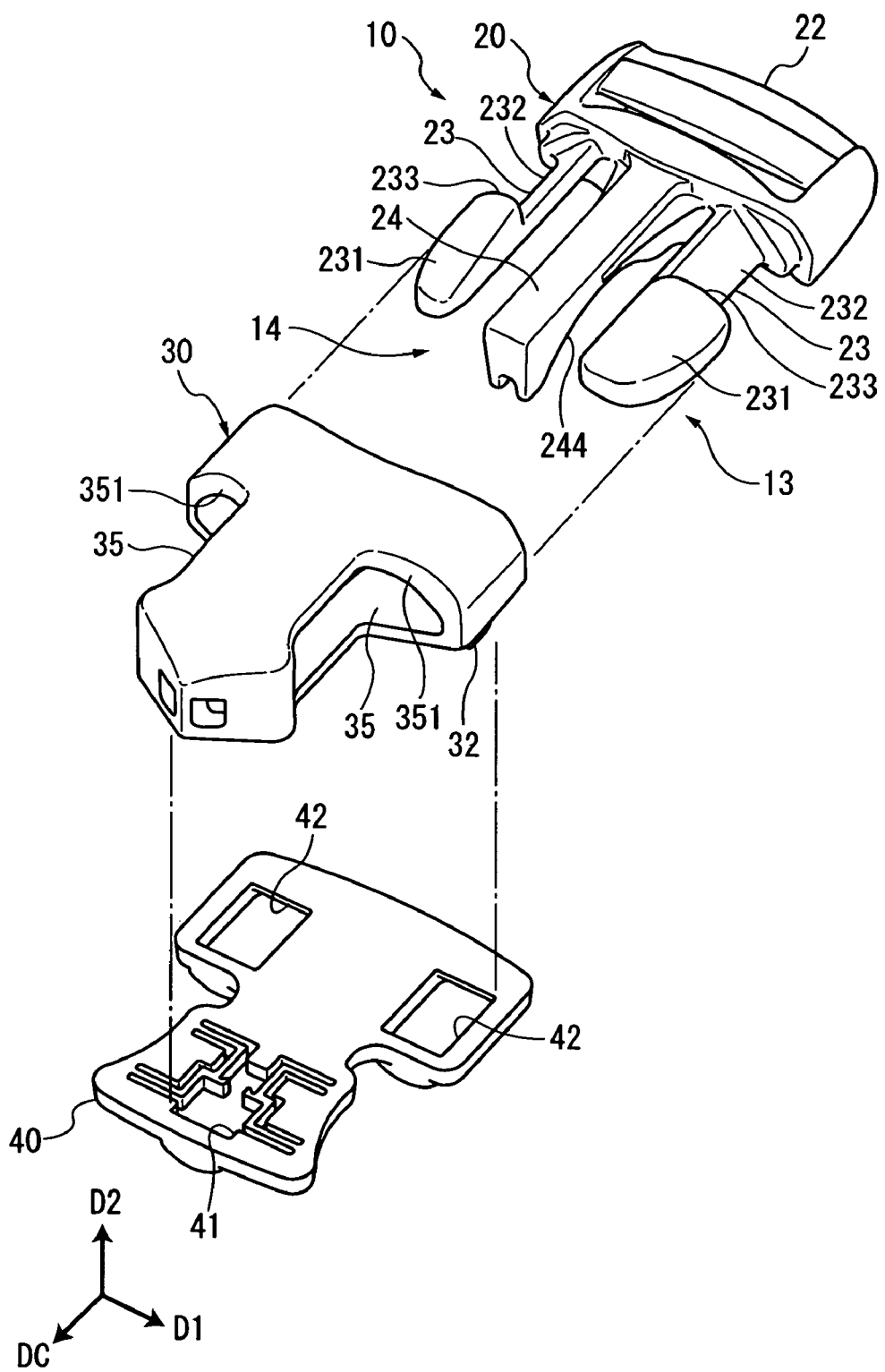
FIG. 1 is an exploded perspective view showing an overall arrangement of a plug and a socket according to an embodiment of the invention.

As shown in FIG. 1, a buckle 10 of an embodiment is a side-release type that is attached to a sheet.

Figure 2:
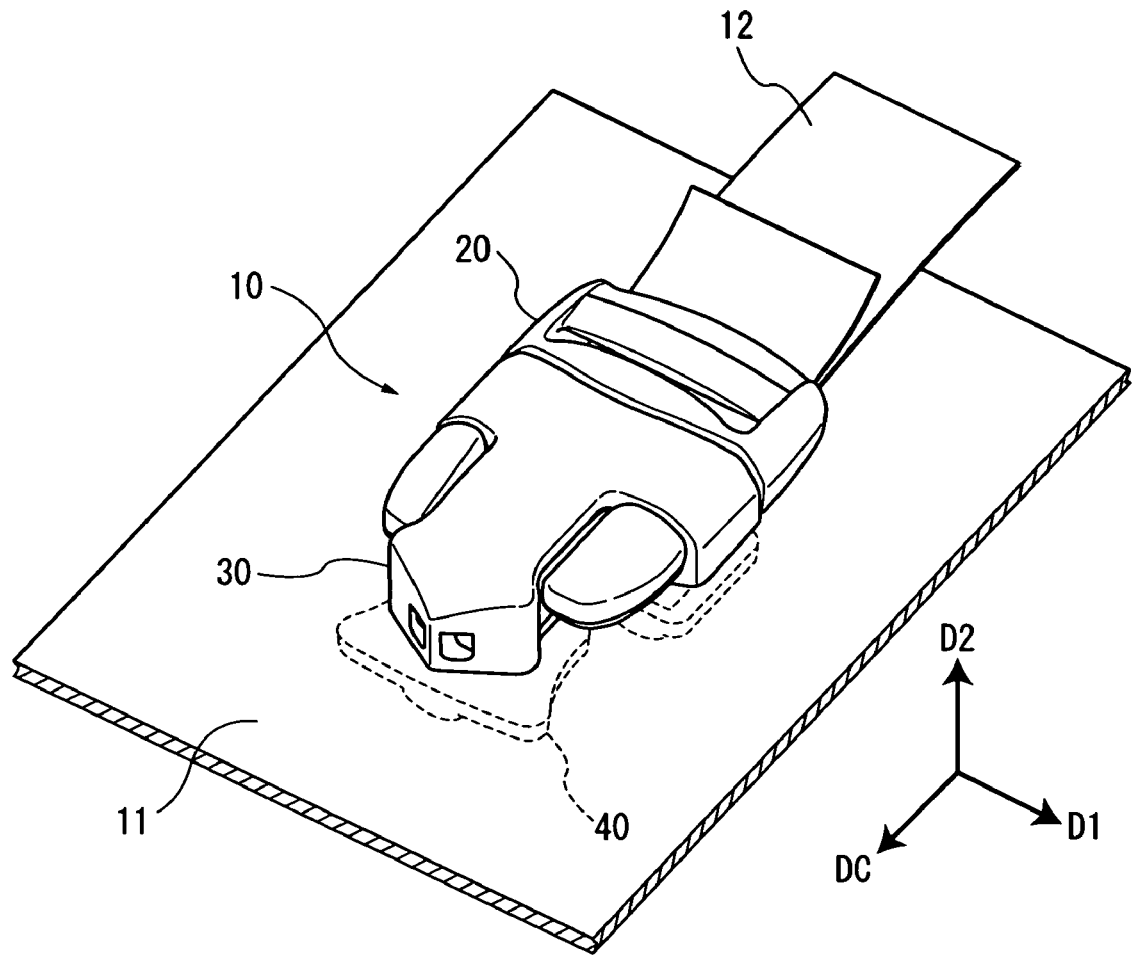
FIG. 2 is a perspective view showing the plug and the socket in use according to the embodiment.
Figure 3:
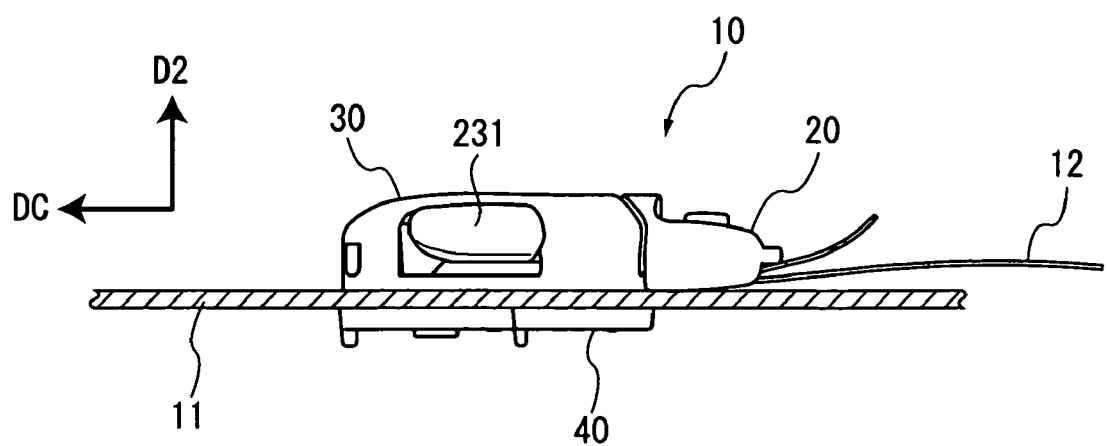
FIG. 3 is a side view showing the plug and the socket in use according to the embodiment.

The buckle 10 consists of a plug 20 and a socket 30 that can be manually engaged or released. As shown in FIGS. 2 and 3, a belt 12 is attached to the plug 20. The socket 30 is fixed on a sheet 11 such as a garment and a fabric of a bag. As shown in FIG. 3, a fixing plate 40 is attached on a rear surface of the buckle 10. The buckle 10 is attached on the garment or the fabric of the bag by sandwiching the sheet 11 between the rear surface thereof and the fixing plate 40.

The buckle 10 of the embodiment has three directions: an engagement direction DC in which the plug 20 is inserted in the socket 30; a first direction D1 intersecting the engagement direction DC; and a second direction D2 intersecting both of the engagement direction DC and the first direction D1 (see FIG. 1). The first direction D1 is a main direction in which the plug 20 is operated to release an engagement of the plug 20 and the socket 30. The second direction is an auxiliary direction in which pressing force is applied for the release. Front sides and rear sides of the buckle 10, the plug 20 and the socket 30 are defined in the second direction D2.

Figure 4:
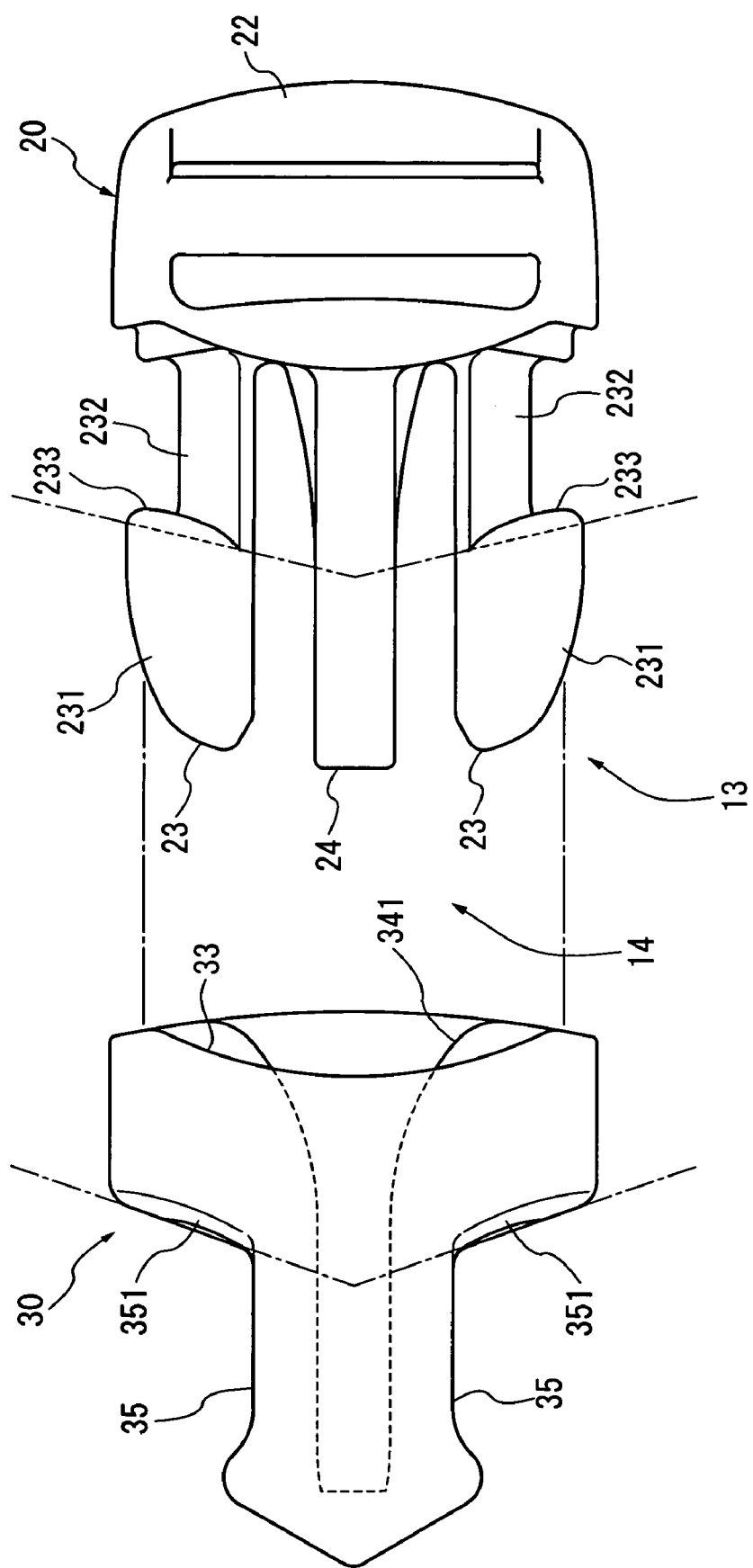
FIG. 4 is a plan view showing the plug and the socket according to the embodiment.
Figure 5:
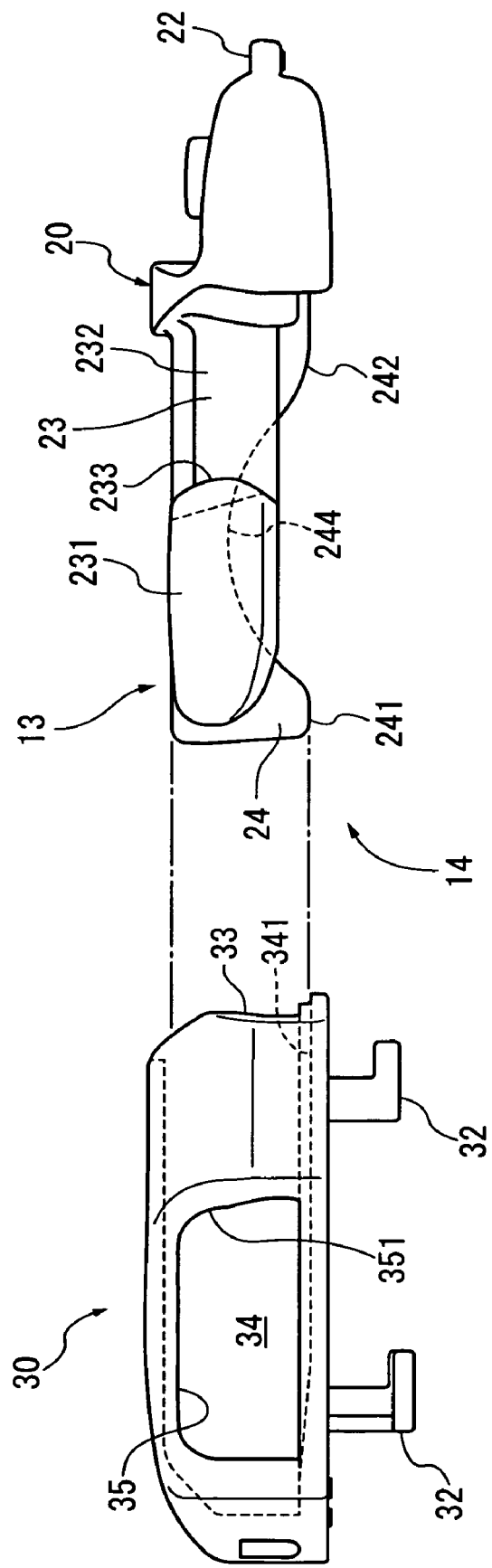
FIG. 5 is a side view showing the plug and the socket according to the embodiment.

FIGS. 4 and 5 show the plug 20 and the socket 30.

The plug 20 has a belt attachment 22 for holding the belt 12, the belt attachment 22 being provided at one end of the plug 20 (i.e. at an end on the opposite side of the inserting direction of the plug 20 into the socket 30).

The plug 20 further has a pair of lock arms 23 and a guide bar 24, both being provided at the other end of the plug 20 (i.e. at the end of the inserting direction of the plug 20 into the socket 30). The lock arms 23 and the guide bar 24 extend in the engagement direction DC. The pair of lock arms 23 and the guide bar 24 are arranged in parallel with each other, the guide bar 24 positioned between the lock arms 23.

Figure 6:
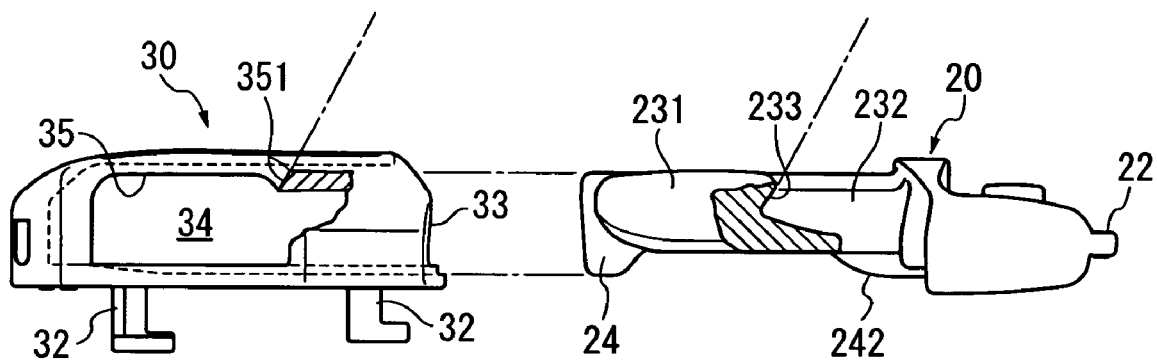
FIG. 6 is a partially sectional side view showing the plug and the socket according to the embodiment.
Figure 7:
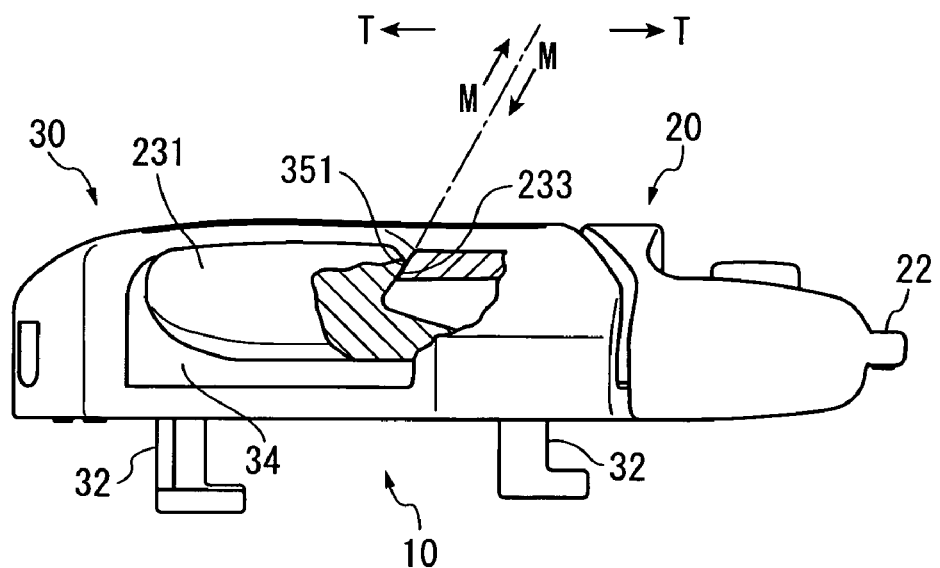
FIG. 7 is another partially sectional side view showing the plug and the socket in engagement according to the embodiment.

As shown in FIGS. 6 and 7, the lock arm 23 has a block 231 that has a bullet shape and is pressed to a tip end side to serve as an operation piece; and an arm 232 that can be elastically deformed, the block 231 being connected with a body of the plug 20 via the arm 232.

Figure 11:
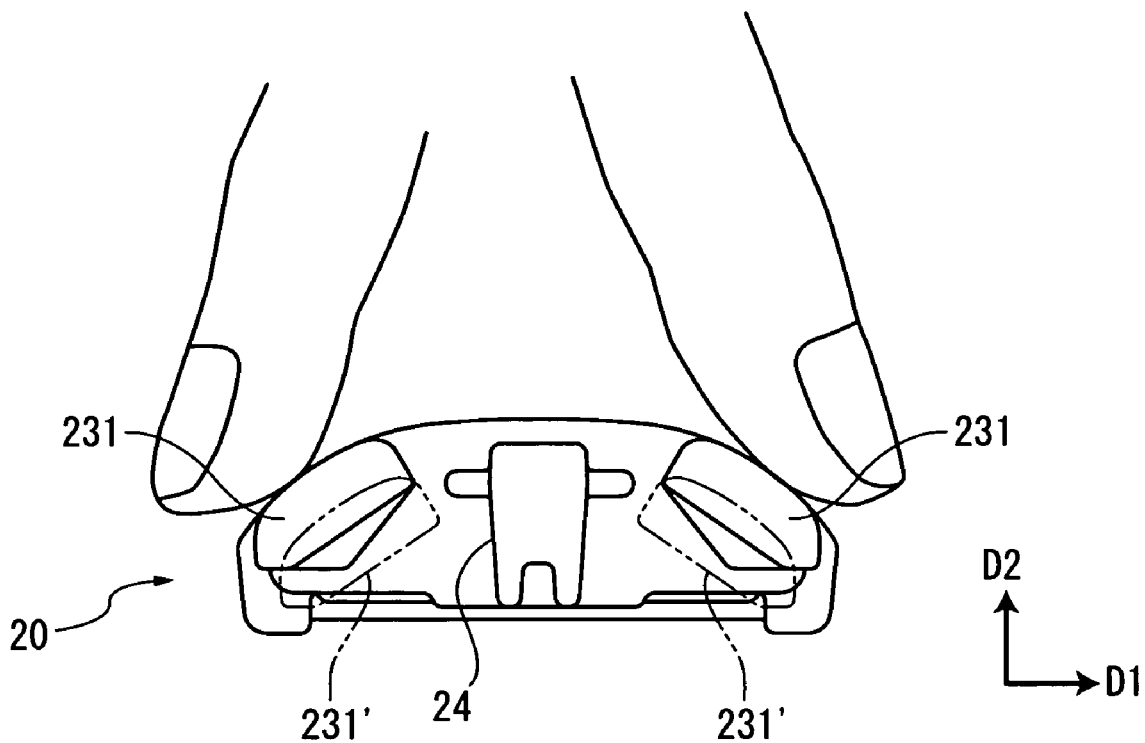
FIG. 11 is a front view showing the plug when being operated according to the embodiment.
Figure 12:
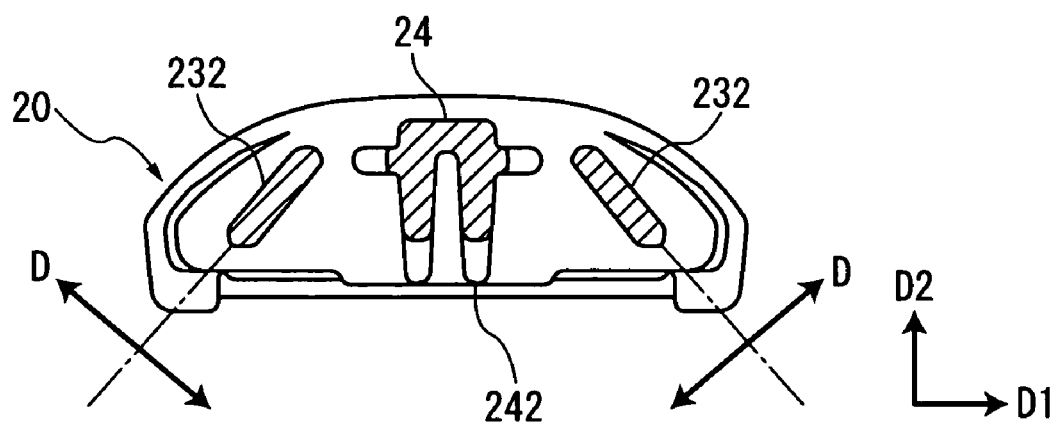
FIG. 12 is a cross section taken along a direction intersecting the engagement direction of the plug of the embodiment.

The arm 232 is slanted by a predetermined angle relative to the rear surface of the buckle 10 (the surface on which the sheet 11 is placed) i.e. relative to the first direction D1 and the second direction D2. The pair of arms 232 are reversely directed in terms of the first direction. Accordingly, the block 231 of the lock arm 23 on a tip end side thereof can be moved in a direction D shown in FIG. 12. As shown in FIG. 11, when being pressed, the block 231 is moved aslant downward in the FIG. 11 to a position shown in a chain line.

The block 231 has a step outside the arm 232. A surface of the step is a slant surface 233 to serve as an arm-side lock member. Although details will be described later, the slant surface 233 serves as a lock mechanism 13 for maintaining the engagement of the plug 20 and the socket 30. The slant surface 233 has a predetermined slant according to the invention (see FIG. 6).

Figure 8:
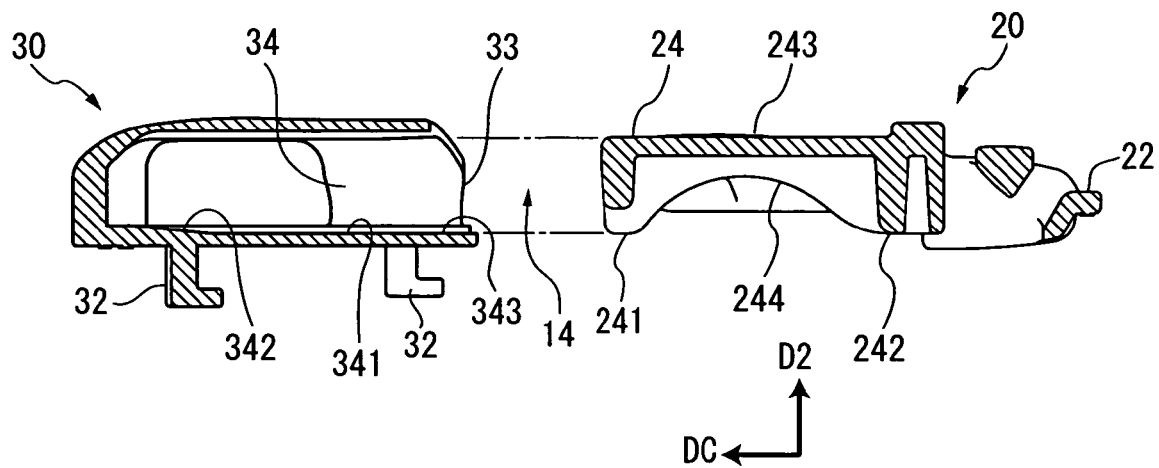
FIG. 8 is a cross section showing a guide mechanism before insertion according to the embodiment.
Figure 9:
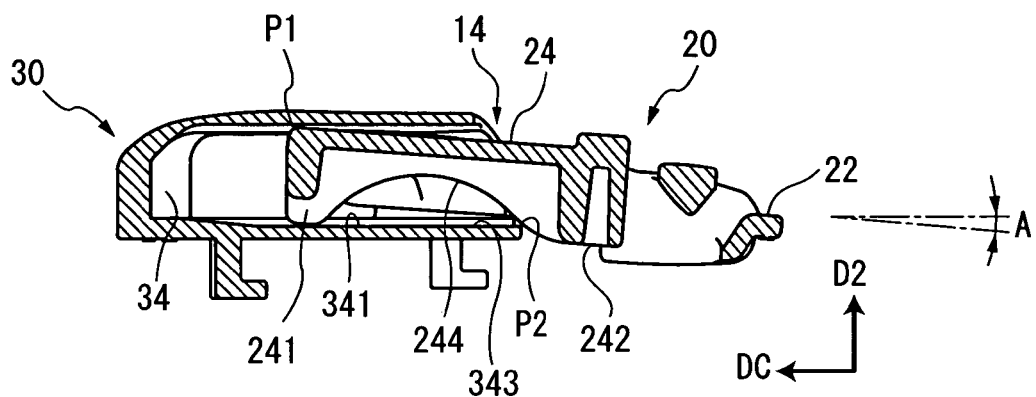
FIG. 9 is another cross section showing the guide mechanism at a halfway point in insertion according to the embodiment.
Figure 10:
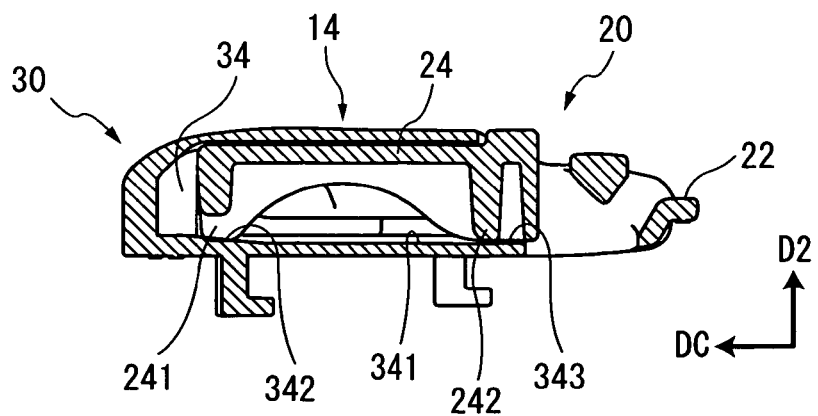
FIG. 10 is still another cross section showing the guide mechanism in engagement according to the embodiment.

As shown in FIGS. 8, 9, 10, the guide bar 24 has a cross section of a reversed U shape. The guide bar 24 has a to-be-held section 241 on a tip end side thereof and a sub to-be-held section 242 on a base end side thereof. The to-be-held section 241 has a predetermined length in the second direction. The sub to-be-held section 242 also has a similar length to that of the to-be-held section 241. An intermediate portion 243 is formed between the to-be-held section 241 and the sub to-be-held section 242. The intermediate portion 243 has an arc dent 244 along the engagement direction DC on the rear side in the second direction D2. Due to the arrangement, the intermediate portion 243 has a sufficiently small length in the second direction D2 compared to the to-be-held section 241 and the sub to-be-held section 242.

In FIGS. 4 and 5, as described above, the rear surface of the socket 30 is attached to the sheet 11. The socket 30 is provided on the rear surface thereof with a plurality of legs 32 for attaching the fixing plate 40. The legs 32 are respectively inserted in engagement holes 41, 42 of the fixing plate 40. The legs 32 and the engagement holes 41, 42 respectively engage with each other by relative movements thereof in the engagement direction DC to be fixed to each other (see FIG. 1). Circumference of the engagement hole 41 of the fixing plate 40 is formed as an elastic engaging mechanism to maintain an engagement of the fixing plate 40 and the socket 30.

The socket 30 has an insertion opening 33 defined on an end thereof and a cavity 34 defined therein, which extends from the insertion opening 33 toward the other end side in the engagement direction DC. The above described lock arms 23 and the guide bar 24 of the plug 20 can be inserted together in the cavity 34.

The cavity 34 has a guide groove 341 defined in an inner surface on the rear surface of the socket 30. The guide groove 341 is dented from the inner surface of the rear side of the socket 30 in the cavity 34. Although details will be described later, the guide groove 341 forms a guide mechanism 14 for stabilizing relative postures of the plug 20 and the socket 30.

The socket 30 has operation openings 35 in lateral surfaces thereof (i.e. surfaces facing to each other in the first direction D1). The operation opening 35 is defined not only in the lateral surface, but also in the upper surface and the rear surface.

The operation opening 35 is formed at a position corresponding to the block 231 of the lock arm 23 of the plug 20. The surface of the block 231 is exposed from the operation opening 35 (in the state shown in the chain line in FIG. 14) when the plug 20 is engaged with the socket 30 (i.e. the state shown in FIG. 2) so as to be manually operated for dissolving the engagement (an operation of pinching the lock arms 23 in directions to bring the lock arms 23 closer to each other including pressing toward the rear side of the buckle 10 i.e. an operation of pinching the lock arms 23 in the first direction D1 including pressing in the second direction D2).

An inner peripheral of the operation opening 35 in a range from the lateral surface to the upper surface of the socket 30 is a slant surface 351 forming a socket-side lock member. Although details will be described later, the slant surface 351 also serves as the lock mechanism 13 for maintaining the engagement of the plug 20 and the socket 30. The slant surface 351 has a predetermined slant according to the invention (see FIGS. 6 and 7).

Thus, the buckle 10 of the invention is provided with the lock mechanism 13 using the lock arms 23 and the operation openings 35 to maintain the engagement of the plug 20 and the socket 30 (see FIG. 1).

As explained above, the slant surfaces 233 are respectively defined on the blocks 231 of the lock arms 23. The slant surfaces 351 are respectively defined on the peripheral of the operation openings 35 of the socket 30.

As shown in FIGS. 2 and 7, when the plug 20 and the socket 30 are in engagement, the blocks 231 are exposed through the operation openings 35 and the slant surfaces 233 and the slant surfaces 351 are respectively in contact.

The slant surfaces 233, 351 intersect the engagement direction DC, the first direction D1 and the second direction D2. The slant thereof is formed such that a tip end in the engagement direction DC (the direction in which the plug 20 is inserted for engagement) is disposed inside the socket 30 (in a direction from one lock arm 23 toward the other lock arm 23 in the first direction D1 as well as from the upper side of the socket 30 to the rear side thereof).

In other words, when the buckle 10 is seen from the lateral side thereof as shown in FIG. 7, the slant surfaces 233, 351 are slanted so as to extend from a rear side of the buckle 10 (the right in FIG. 7) toward a front side of the buckle 10 (the left in FIG. 7) as extending from an upper surface side of the buckle 10 (the upper side in FIG. 7) toward a rear surface side of the buckle 10 (the lower side in FIG. 7). In other words, when the buckle 10 is seen from the upper surface side thereof as shown in FIG. 4, the slant surfaces 233, 351 are slanted so as to extend from the rear side of the buckle 10 (the right in FIG. 4) toward the front side of the buckle 10 (the left in FIG. 4) as being extending from an outer side of the buckle 10 toward an inner side of the buckle 10.

In the lock mechanism 13, when the lock arms 23 are bent toward each other to be inserted in the insertion opening 33 and are further moved into the cavity 34 to a state where the blocks 231 are exposed through the operation openings 35, the slant surfaces 233 and 351 come into engagement, thereby preventing the plug from being pulled out.

Figure 13:
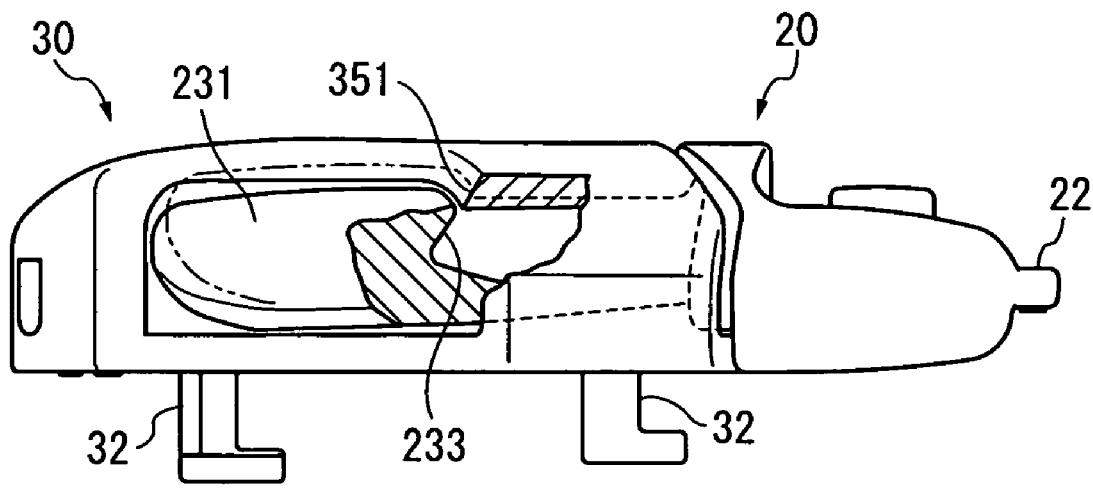
FIG. 13 is a side view showing the plug and the socket when being operated according to the embodiment.
Figure 14:
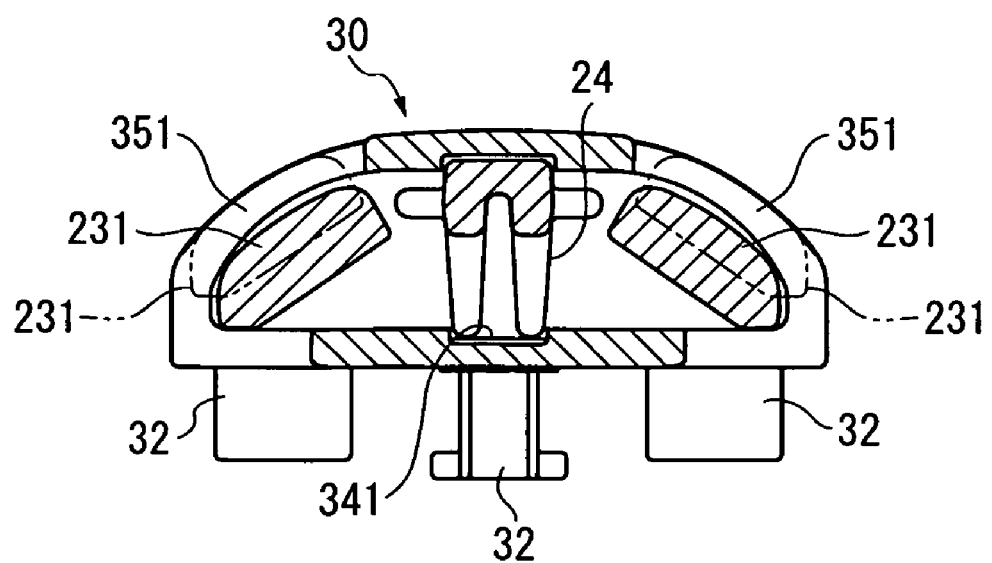
FIG. 14 is a cross section taken along the direction intersecting the engagement direction of the plug and the socket in the operation of the embodiment.

On the other hand, when the blocks 231 exposed through the operation openings 35 are manually operated (see FIG. 11) by bending the lock arms 23 toward each other, the engagement of the slant surfaces 233 and 351 is released, thereby dissolving the engagement of the plug 20 and the socket 30 (see FIGS. 13 and 14).

In the above described lock mechanism 13, the slant of the slant surface 233, 351 functions as a wedge, so that excellent pull-out function can be obtained.

As shown in FIG. 7, when a force T in a release direction (e.g., a tensile force of the belt 12) is applied to the plug 20 and the socket 30 in engagement, relative displacements M of the slant surfaces 233 and 351 are made in a direction to enhance the engagement due to the specific slant of the slant surfaces 233 and 351, thereby providing excellent pull-out function.

The buckle 10 of the embodiment also has the guide mechanism 14 using the guide bar 24 and the guide groove 341 in the cavity 34 for maintaining the postures of the plug 20 and the socket 30 in an plug-inserted state or in an engagement state.

As described above, the guide bar 24 has the to-be-held section 241 on the tip end side thereof, the sub to-be-held section 242 on the base end side thereof and the arc dent 244 on the rear surface of the intermediate portion 243. In the inner surface of the cavity 34 of the socket 30, the guide groove 341 is defined from the insertion opening 33 toward the end of the cavity 34.

A height (a length in the second direction D2) of the cavity 34 in the guide groove 341 is a little larger than the to-be-held section 241 of the guide bar 24 of the plug 20, while a height thereof outside the guide groove 341 is sufficiently small relative to the to-be-held section 241. Accordingly, the to-be-held section 241 of the guide bar 24 can be inserted only in the guide groove 341.

The guide groove 341 has a cross section of a so-called bell mouth shape, in which the width of the guide groove 341 is wider at an end thereof on the insertion opening 33 side (the rear side of the engagement direction DC) and becomes smaller as coming closer to the end of the cavity 34 i.e. the other end side of the engagement direction DC (a front side thereof) to be a predetermined width. Due to the arrangement, the guide bar 24 of the plug 20 is guided at the tip end side thereof, so that the plug 20 has a predetermined posture relative to the socket 30 in engagement.

A surface of the guide groove 341 in the deepest portion thereof (the socket side end in the engagement direction DC) is gradually raised to be a slant surface successive to the height of the vicinity of the guide groove 341. This slant surface serves as a holding section 342. The height of the cavity 34 in the holding section 342 is substantially the same as that in the to-be-held section 241, so that a clearance between the cavity 34 and the guide bar 24 at the tip end portion is small in the engagement.

A height of the sub to-be-held section 242 at the base end side of the guide bar 24 is substantially the same as that of the cavity 34 in the guide groove 341, so that a clearance between a corresponding portion of the cavity 34 (a sub holding section 343, see FIGS. 8 and 10) and the guide bar 24 at the base end side is small in the engagement.

In a state where the clearances between the holding section 342 and the to-be-held section 241 as well as between the sub holding section 343 and the sub to-be-held section 242 are small, the plug 20 is held in a predetermined posture relative to the socket 30. Such holding function is only provided when the plug 20 is engaged with the socket 30 or just before the engagement. In the middle of the insertion of the plug 20 into the socket 30 for engagement, the clearance relative to the cavity 34 of the socket 30, the insertion opening 33 or the like can be sufficient due to the arc dent 244 defined in the intermediate portion 243 of the guide bar 24.

The guide mechanism 14 having the above described arrangement provides guiding as shown in FIGS. 8, 9, 10.

In FIG. 8, the plug 20 and the socket 30 are separately aligned along the engagement direction DC to insert the tip end of the guide bar 24 in the insertion opening 33.

In FIG. 9, the tip end of the guide bar 24 inserted in the insertion opening 33 is guided by the guide groove 341 at the to-be-held section 241, thereby the plug 20 and the socket 30 are adjusted to have an appropriate posture into the engagement (a posture in a plane including the engagement direction DC and the first direction D1).

At this time, the postures in a plane including the engagement direction DC and the second direction D2 will be guided by the holding sections, so that the plug 20 and the socket 30 can have any slant in that plane.

In the operation for engagement, the insertion can be smooth and easy by slanting the plug 20 in the second direction D2 (see the angle A in FIG. 9) in a phase where the tip end of the guide bar 24 is inserted in the cavity 34).

When slanting, the tip end of the guide bar 24 contacts the inner surface of the cavity 34 on the front side of the socket 30 at a contact point P1, while the edge of the insertion opening 33 on the rear side contacts the arc dent 244 of the guide bar 24 at a contact point P2, thereby allowing a smooth movement of the plug 20.

As the plug 20 is further moved in the socket 30, the contact point P1 on the front side shifts for holding the holding section 342 and the to-be-held section 241, while the contact point P2 on the rear side shifts for holding the sub holding section 343 and the sub to-be-held section 242. Then, in the complete engagement state, the plug 20 and the socket 30 are held in the secure postures.

When pulling out the plug 20, the contact points shift in a reversed manner of that stated above, so that the plug 20 can be smoothly pulled out.

According to the above described embodiment, following advantages can be obtained.

In the lock mechanism 13, the slant surface 233 (the arm-side lock member) and the slant surface 351 (the socket-side lock member), which are slanted in the three directions, can slide on each other, so that the arm-side lock member and the socket-side lock member displace in the first direction D1 and the second direction D2 when a force pulling the plug 20 and the socket 30 apart from each other is applied in the engagement direction DC, thereby a further strong lock state can be obtained.

On the other hand, when dissolving the lock state, the slant surfaces 233 and 351 (as the arm-side lock member and the socket-side lock member) can be moved along the surfaces by bending the pair of lock arms 23 closer to each other in the first direction D1 while pressing in the second direction D2, thereby smoothly dissolving the lock state.

In the embodiment, the slant surface 351 of the socket-side lock member is more slanted toward the front side of the engagement direction DC as becoming inside on the peripheral of the operation opening 35 (see, e.g., FIG. 6), thereby further enhancing the pull-out function.

The slant surface 233 as the arm-side lock member is a step defined on the block 231 on the tip end side of the lock arm 23, and the slant surface 351 as the socket-side lock member is the peripheral of the operation opening 35, so that both have a simple shape and can be easily obtained by diverting conventional arrangements.

In the guide mechanism 14 of the embodiment, the guide bar 24 and the cavity 34 are arranged to have the predetermined shape, so that the postures of the plug 20 and the socket 30 can be guided in a starting phase of insertion and the insertion can be facilitated by the two contact points in a middle phase of the insertion. When the plug 20 and the socket 30 come into engagement, the contact point P1 on the front side of the socket 30 shifts for holding the holding section 342 and the to-be-held section 241, while the contact point P2 on the rear side thereof shifts for holding the sub holding section 343 and the sub to-be-held section 242, thereby securing the appropriate postures of the plug 20 and the socket 30.

In addition, the dent 244 of the guide bar 24 is a recession of an arc shape, so that the sub holding section 343 can be smoothly guided into engagement. The clearance can be maximum in the middle of the intermediate portion, where the slant between the plug 20 and the socket 30 is maximum, thereby obtaining sufficient strength while having the simple shape.

The scope of the present invention is not restricted to the above-described embodiments, but includes modifications and improvements as long as an object of the present invention can be achieved.

For example, both of the slant surface 233 of the arm-side lock member and the slant surface 351 of the socket-side lock member are provided in the above described embodiment, but one of the slant surfaces 233 and 351 may have a different shape. The step of the block 231 (the arm-side lock member) may be a projection to be slid on the slant surface 351 of the socket 30 along the slant direction. The peripheral of the operation opening 35 (the socket-side lock member) on the rear side in the engagement direction DC may be provided with a contact projection to be slid on the slant surface 233 of the lock arm 23. However, the above described arrangement in which both have the predetermined slant surfaces provides a wide contact area, thereby preventing concentrated load for smooth operation.

In the embodiment, the peripheral of the operation opening 35 is arranged to have the slant such that the peripheral becomes closer to the front side of the engagement direction DC as becoming inside. However, the slant surface 351 of the socket-side lock member only needs to have the slant in the three directions, so that the peripheral of the operation opening may have any shape.

The slant angle or the like of the slant surface 233 of the arm-side lock member and the slant surface 351 of the socket-side lock member may be determined in accordance with requirements in an actual engagement operation or pull-out function.

The slant surfaces 233 and 351 are not limited to a plane, but may be a curved surface. When the slant surface is provided to only one of the socket and plug, contact condition of the slant surfaces needs not to be taken into consideration, so that any curved surface can be more freely employed. Accordingly, the pull-out function may be arranged so as to be gradually enhanced in accordance with the tensile force by gradually changing curvature and slant angle, for example.

The to-be-held section 241 on the tip end side of the guide bar 24 is arranged to have the same height as the sub to-beheld section 242 on the base end side in the embodiment, but the height of the to-be-held section 241 may be smaller.

Figure 15:
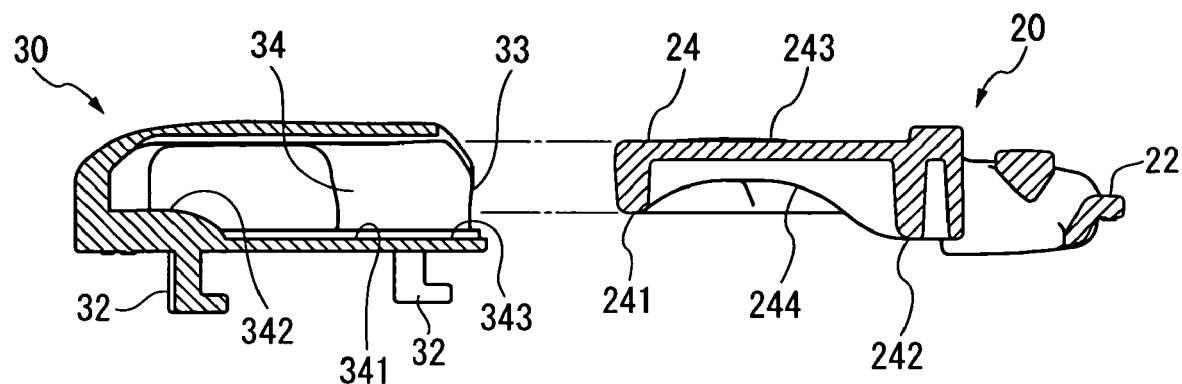
FIG. 15 is a cross section showing a plug and a socket before engagement according to another embodiment of the invention.
Figure 16:
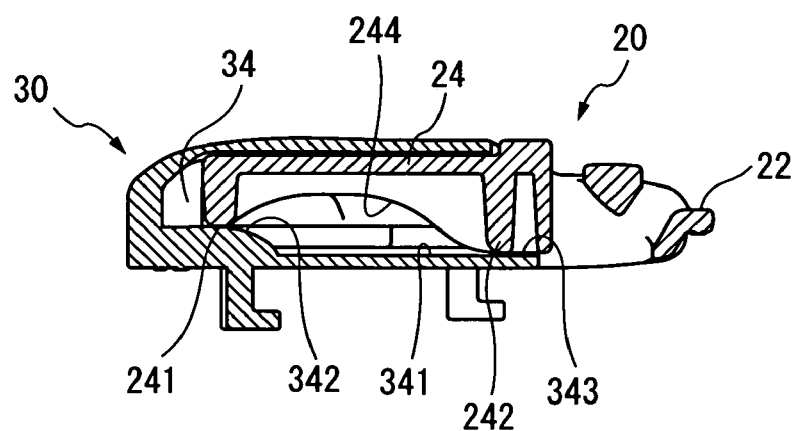
FIG. 16 is another cross section showing the plug and the socket in engagement according to the embodiment of FIG. 15.

In an embodiment of FIGS. 15 and 16, the height of the dent 244 is sufficiently small relative to the sub to-be-held section 242 that has a large height, and the to-be-held section 241 on the tip end side is larger than the dent 244 but smaller than the sub to-be-held section 242. On the other hand, in the socket 30, the holding section 342 is positioned at a higher position relative to the sub holding section 343, so that even a thin holding section 241 can be securely held in the engagement state.

The to-be-held section 241 on the tip end side of the guide bar 24 is arranged to have a larger height than the intermediate portion 243 in the embodiment, but the height of the to-be-held section 241 may be the same or smaller compared to the intermediate portion 243.

Figure 17:
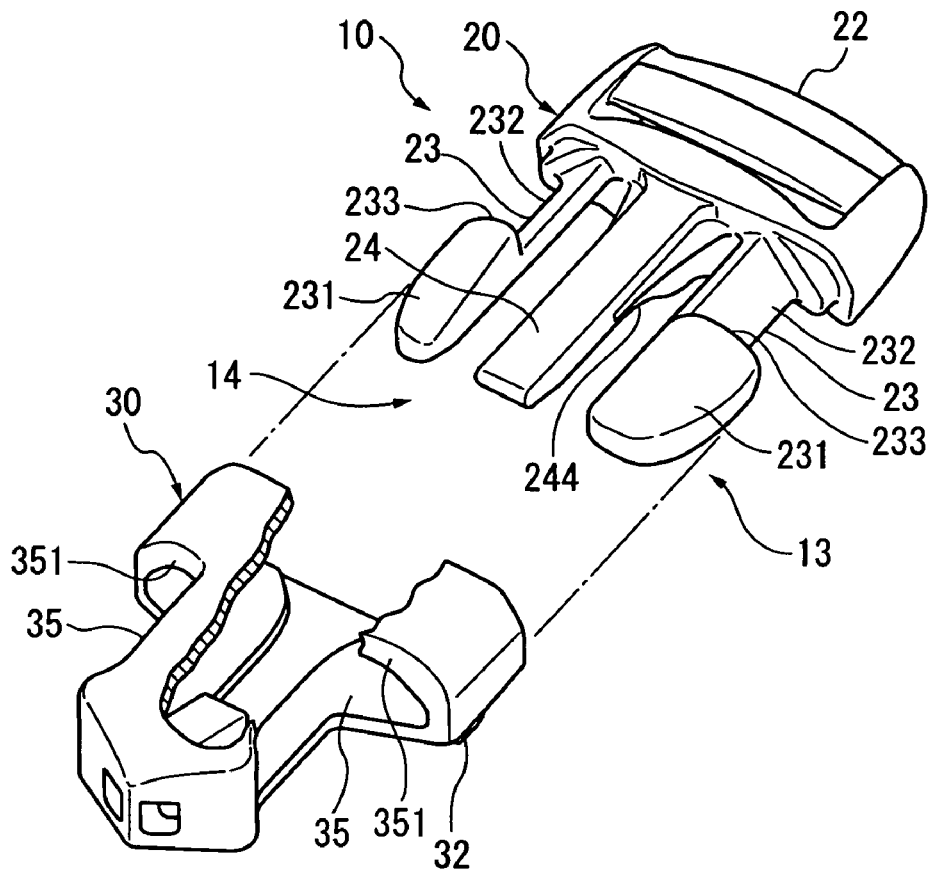
FIG. 17 is a perspective view showing a plug and a socket before engagement according to still another embodiment of the invention.
Figure 18:
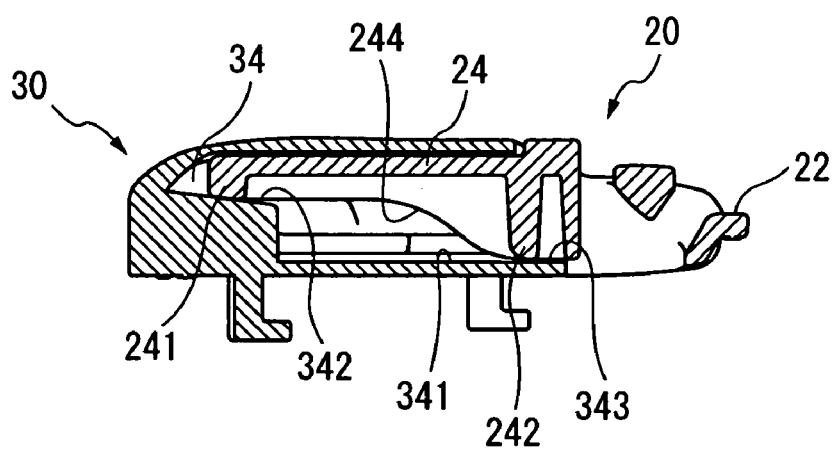
FIG. 18 is a cross section showing the plug and the socket in engagement according to the embodiment of FIG. 17.

In an embodiment of FIGS. 17 and 18, the guide bar 24 has a large height in the sub to-be-held section 242 and gradually becomes thinner along the dent 244 to have a smallest height. The guide bar 24 has a constant height from the smallest point to the to-be-held section 241 on the tip end side thereof. Even in this arrangement, the holding portion 342 is set at a high position, thereby providing good operability in the middle of the insertion and maintaining the postures of the plug and the socket in the engagement.

Figure 19:
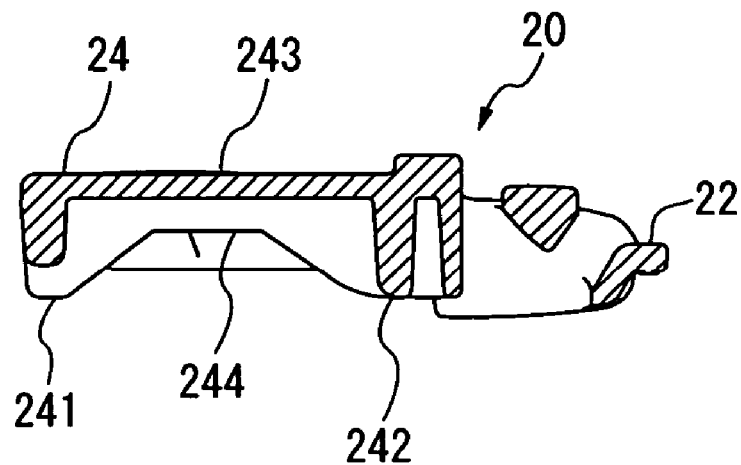
FIG. 19 is a cross section showing a plug according to yet another embodiment of the invention.

In the embodiment, the dent 244 of the intermediate portion 243 has an arc shape. However, as shown in FIG. 19, the dent 244 may be substantially indented or may have a recession of a rounded triangle shape. That is, the shape of this portion can be determined without limitation. However, the shape of the arc dent 244 in the embodiment is preferable in term of the guiding function.

Figure 20:
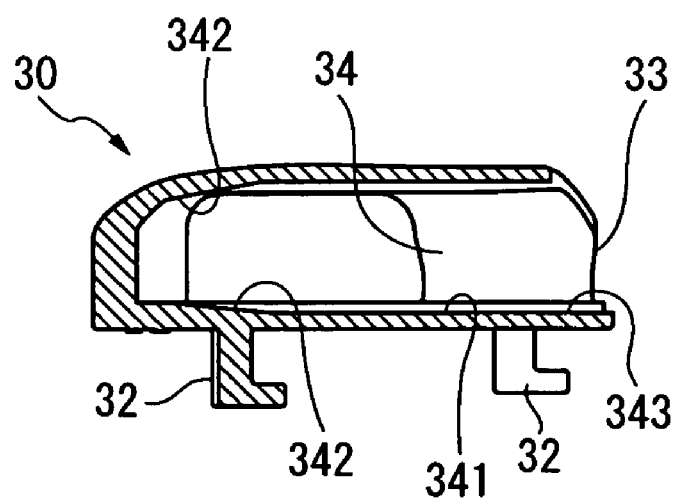
FIG. 20 is a cross section showing a socket according to yet another embodiment of the invention.

The above described embodiment has the arrangement in which the slant surface as the holding section 342 for holding the to-be-held section 241 in engagement is provided on the inner surface of the cavity 34 only on the rear side of the buckle 10. However, the slant surface may be provided only on the front side thereof or both of the front and rear sides as shown in FIG. 20 (the upper and lower portions in FIG. 20). The guide groove 341 may be also provided on the inner surface of the cavity 34 on both of the front and rear sides.

The one guide bar 24 is provided in the middle in the embodiment, but two or more guide bars may be arranged.

Figure 21:
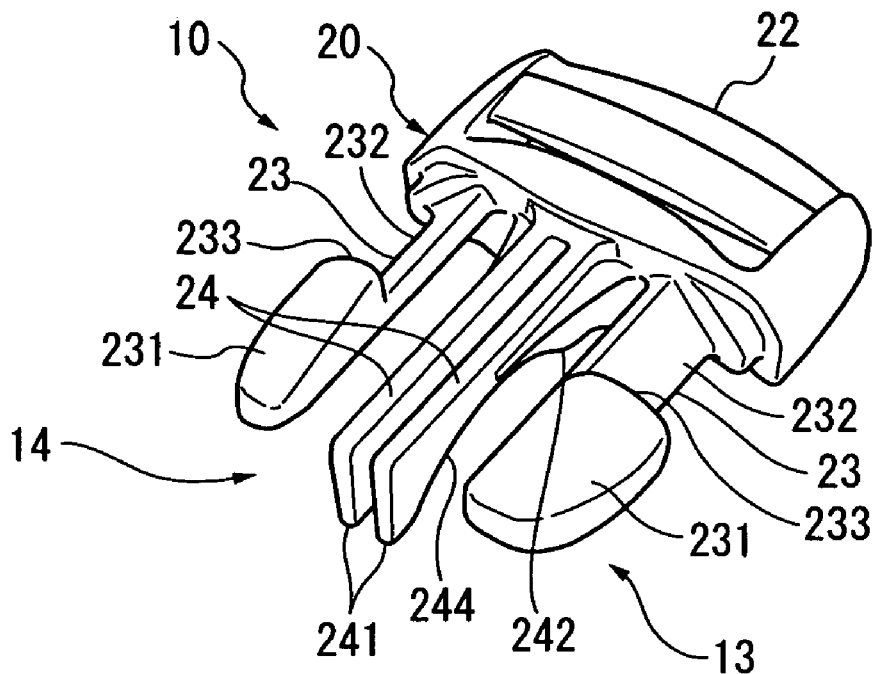
FIG. 21 is a perspective view showing a plug according to further embodiment of the invention.
Figure 22:
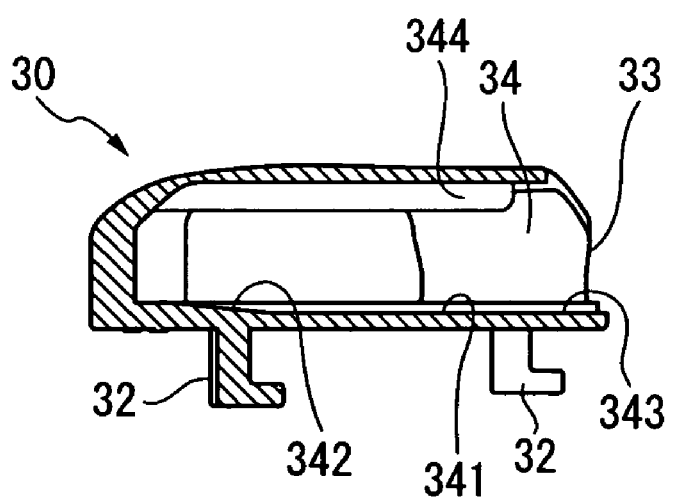
FIG. 22 is a cross section showing a socket according to the embodiment of FIG. 21.

In an embodiment of FIGS. 21 and 22, two guide bars 24 are arranged in parallel to the plug 20, each of the two guide bars 24 having the to-be-held section 241 and the sub to-be-held section 242. In the socket 30, a guide rail 344 is provided to the cavity 34 on the front side. The guide rail 344 is disposed between the two guide bars 24 when the plug 20 and the socket 30 are engaged with each other, so that the function of the guide mechanism 14 for guiding the plug 20 and the socket 30 can be obtained. When the guide rail 344 is used, the guide mechanism 341 described above may not be employed.

In the embodiment, a typical buckle 10, which has the arm-side lock member (the slant surface 233) in each of the pair of lock arms 23 and the guide bar 24 between the lock arms 23, is used as an example for explanation. However, the present invention is not limited to this arrangement. For example, three or more lock arms 23 may be provided, provided that two of the lock arms 23 are arranged in parallel in the first direction D1. The other lock arms can be used for auxiliary lock function. The guide bar 24 may be provided more than one and may be disposed not only between the pair of lock arms 23 but also outside thereof.

The shape of the buckle 10 is not limited to a flat shape, but may be round or square in cross section.

In the embodiment, the buckle 10 is a sheet attachment type, where the socket 30 is attached to the sheet 11 by the fixing plate 40. However, a belt-holding part may be attached to the socket 30 and the buckle may be used for coupling the belt ends. The buckle 10 explained in the embodiment has the slant surfaces 351, 233, which are rather specific, so that this buckle may be difficult to manufacture by molding using a typical die.

However, the buckle can be easily molded by using an injection molding die according to the invention.

Embodiments of the injection molding die of the present invention will be described below with reference to the attached drawings.

Figure 23:
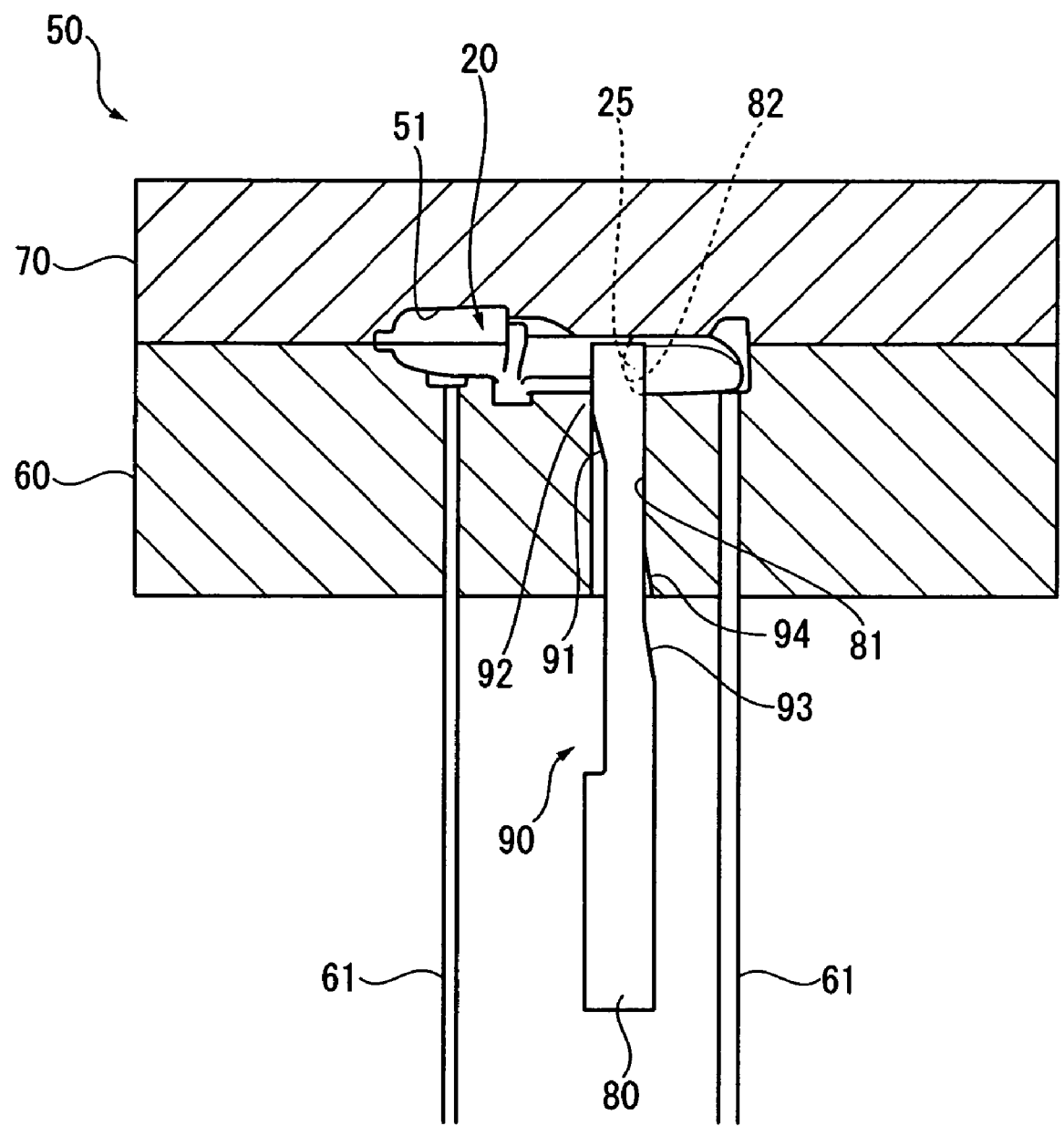
FIG. 23 is a cross section showing a state where a die is closed according to an embodiment of the invention.
Figure 24:
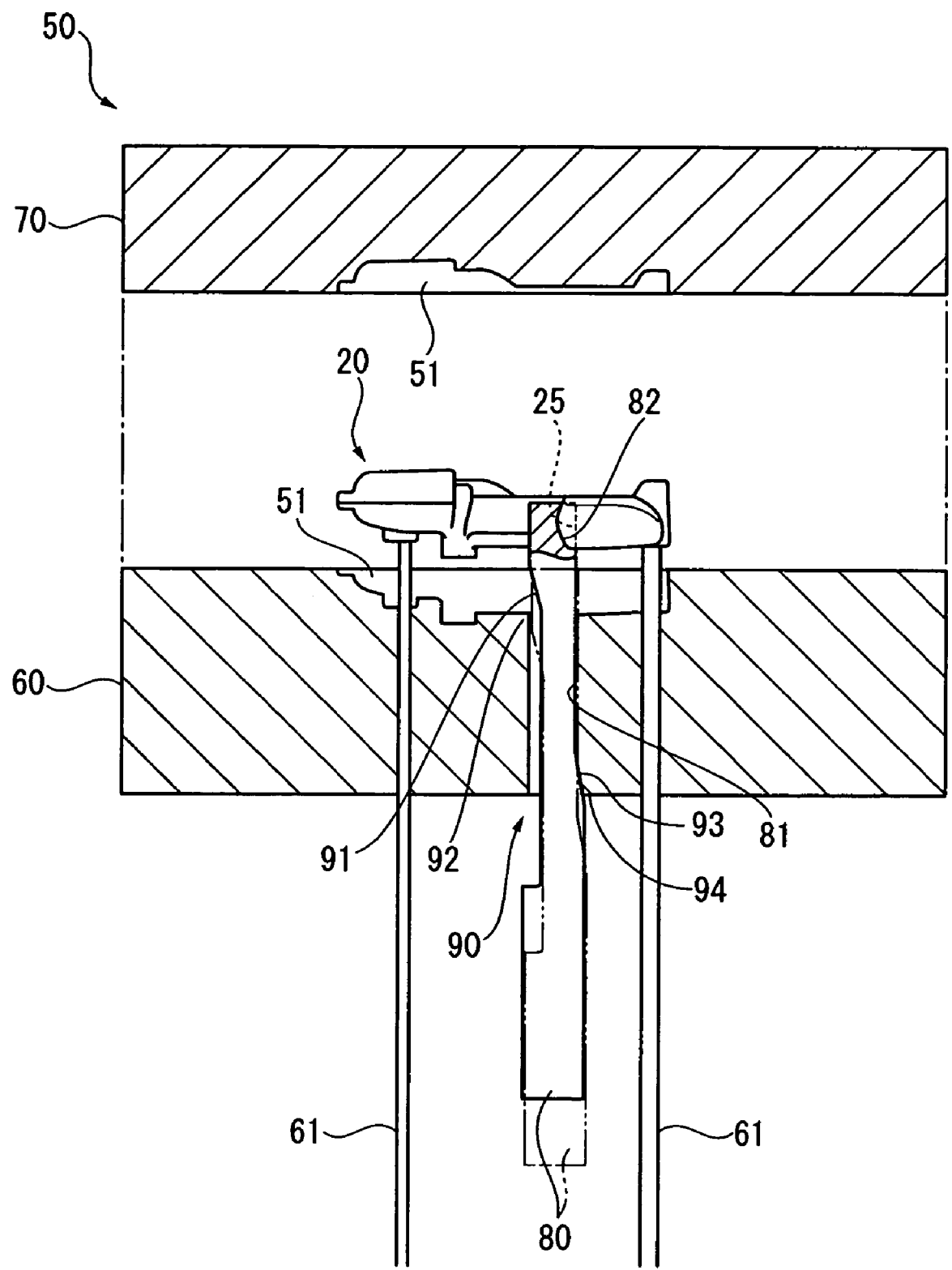
FIG. 24 is another cross section showing a state where the die is opened according to the embodiment of FIG. 23.
Figure 25:
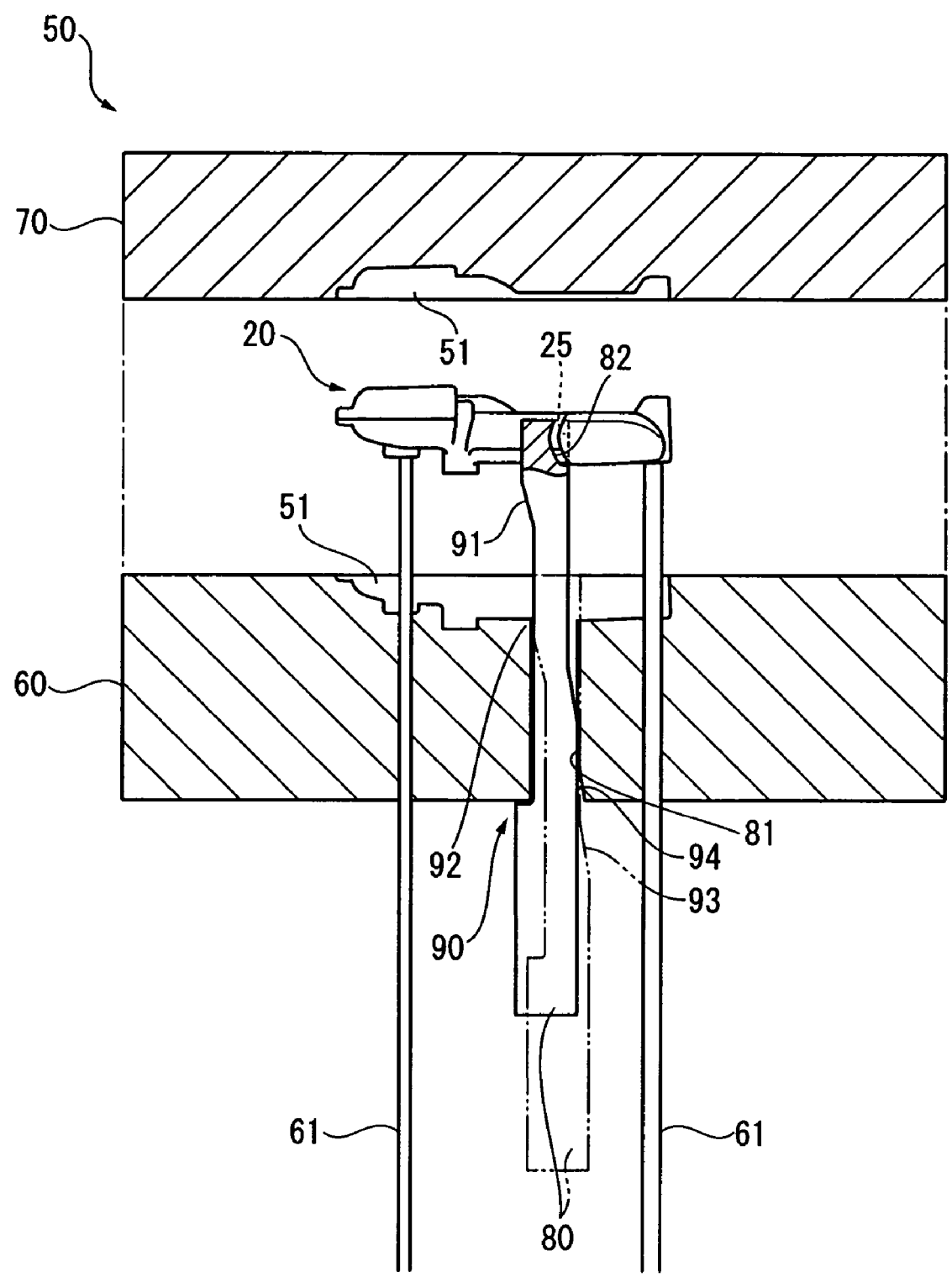
FIG. 25 is another cross section showing a state where a molding article is removed from the die according to the embodiment of FIG. 23.

In FIGS. 23 to 25, an injection molding die 50 of the embodiment has a fixed die 60 and a movable die 70, and the molding cavity 51 is defined inside the injection molding die 50.

The injection molding die 50 is set to an ordinary injection molding machine (not shown) for use. The fixed die 60 is set on a fixed side of the injection molding machine. The movable die 70 is set on a movable side thereof. The fixed die 60 and the movable die 70 are closed by a closing mechanism of the injection molding machine. In a closing state (see FIG. 23), a molten resin is injected from an injector of the injection molding machine into the cavity 51. When the resin is solidified as being cooled, the resin is removed as a molding article (the plug 20 described later).

In order to remove the molding article, ejector pins 61 are provided to the fixed die 60. The ejector pins 61 are inserted in the cavity 51 by a drive mechanism (not shown) to eject the molding article out (see FIGS. 24 and 25). A direction in which the ejector pin 61 is moved is set to be the same as the opening/closing direction of the fixed die 60 and the movable die 70.

In the embodiment, the molding article of the injection molding die 50 is the plug 20 (male member of the buckle), which is used for tightening the belt and the like.

Figure 26:
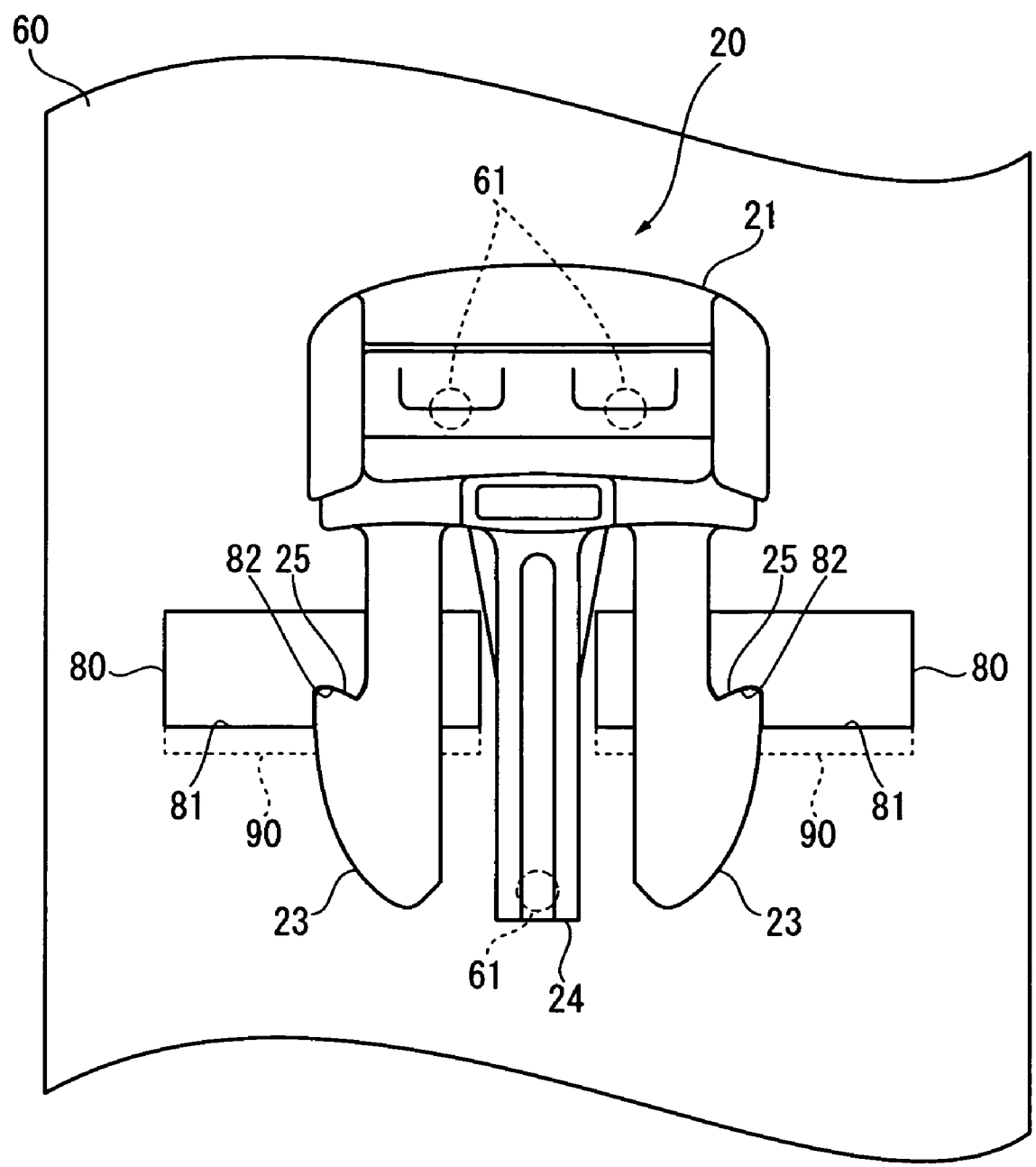
FIG. 26 is a plan view showing a primary portion of the molding article and the die in the state of FIG. 24.
Figure 27:
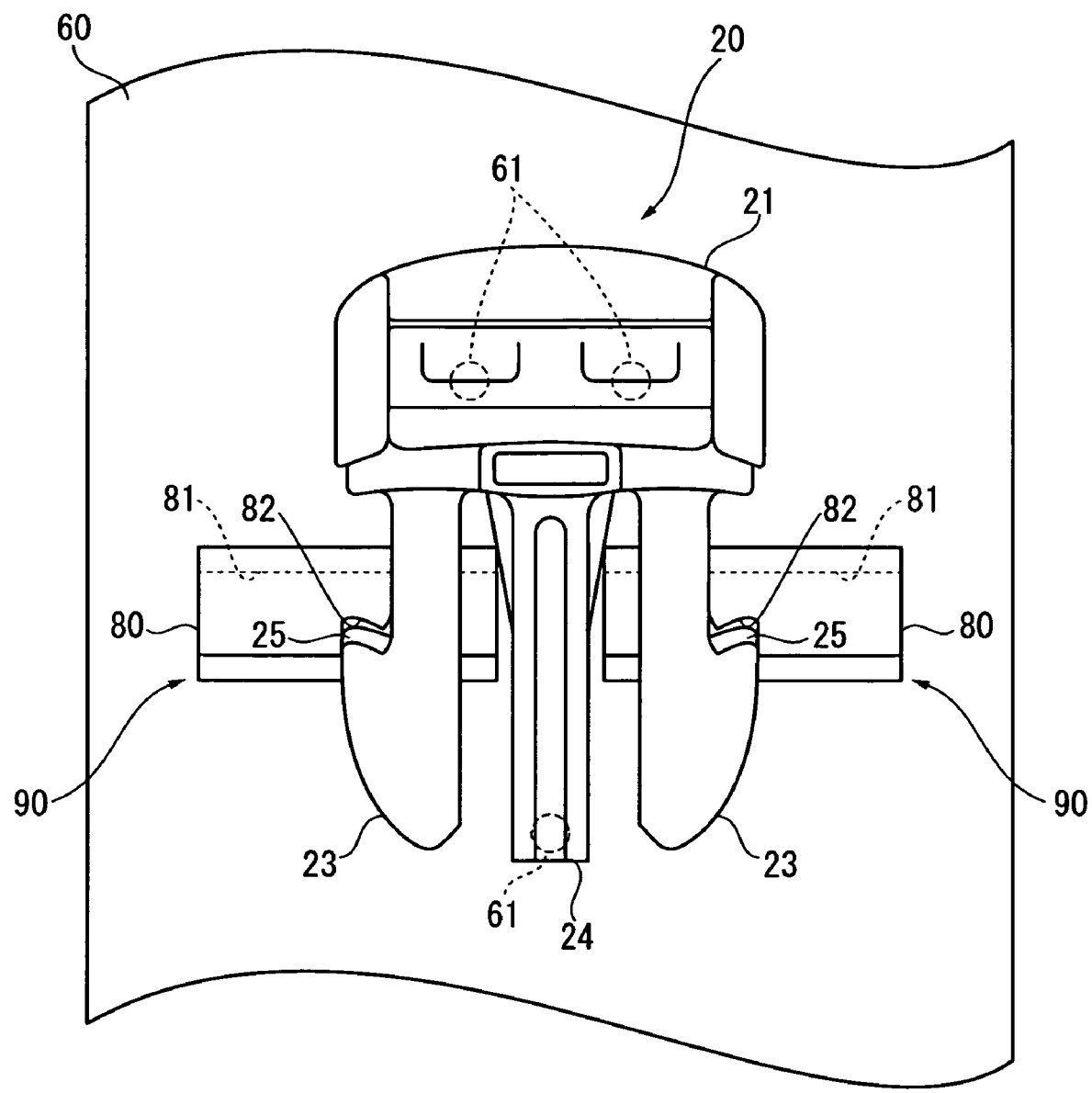
FIG. 27 is another plan view showing a primary portion of the molding article and the die in the state of FIG. 25.

As shown in FIGS. 26 and 27, the plug 20 has a body 21 to which the belt is attached; the pair of lock arms 23 and the guide bar 24 on one end thereof. The guide bar 24 is used when the socket (female member of the buckle, not shown) is inserted in the plug 20 in order to appropriately guiding the insertion postures of the socket and the plug. The lock arm 23 engages with the socket when being inserted therein for maintaining the engagement.

The lock arm 23 has a unique wedge shape portion 25 at the tip thereof for engaging with the socket. The wedge shape portion 25 expands more outwardly as coming from the tip toward a base of the lock arm 23 and is formed by making a step in the middle portion of the lock arm 23. The step face of the middle portion has a wedge shape by disposing the outer side of the lock arm 23 on the base side and the inner side thereof on the tip end side.

The wedge shape portion 25 is formed such that the outer peripheral of the step face is slanted relative to the longitudinal and traverse directions of the plug 20. Specifically, in FIGS. 26 and 27, the traverse direction of the figures is the traverse direction of the plug 20, while the direction perpendicular to the figures is the longitudinal direction of the plug 20. The outer peripheral of the wedge shape portion 25 is slanted such that the inner surface (the side near to the guide bar 24, the side facing to each other) of the outer peripheral in the depth direction of the figures is oriented to the front side of the figures.

The above described wedge shape portion 25 is an undercut in the molding of the plug 20. The undercut is provided in a direction intersecting both of the longitudinal direction and the traverse direction of the plug 20. In other words, the depth direction of the wedge shape portion 25 (the undercut) is oriented in the direction of the tip end of the lock arm 23 of the plug 20.

In order to manufacture the plug 20, the cavity 51 has an inner surface that corresponds to the outline of the plug 20. The fixed die 60 and the movable die 70 have a dividing plane in the traverse direction of the plug 20 (the planes illustrated in FIGS. 26 and 27) and are opened/closed in the longitudinal direction (the direction perpendicular to the figures) (see FIGS. 23 to 25).

In the die 50 in which the wedge shape portion 25 is the undercut, the molding article i.e. the plug 20 cannot be removed in a simple way. Hence, the die 50 of the embodiment has a slide core 80 that is advanceable and retractable into the cavity 51; and a displacement mechanism 90 for displacing the slide core 80 in a depth direction of the undercut in order to form the undercut.

The slide core 80 is a member having a square column shape and being arranged in parallel with the ejector pins 61. The slide core 80 is inserted into a sleeve 81 defined in the fixed die 60 and advanced/retracted in an up-and-down direction in the figures by a drive mechanism (not shown) disposed on the lower position in the figures. Note that, the ejector pins 61 and the sleeve 81 share the same drive mechanism in the embodiment.

The tip end of the slide core 80 projects into the cavity 51, even when the slide core 80 is fully retracted (see FIG. 23). The tip end of the slide core 80 is in a space near the wedge shape portion 25 outside the lock arm 23 of the plug 20, so that the tip end does not interfere with the plug 20 as the molding article.

One lateral surface of the tip end of the slide core 80 is a molding surface 82. The molding surface 82 is provided in a direction in which the tip end of the lock arm 23 of the plug 20 is oriented i.e. the depth direction of the undercut (the wedge shape portion 25).

The molding surface 82 has a molding shape (concaves and convexes in the depth direction of the undercut) corresponding to the undercut portion (the wedge shape portion 25) of the plug 20. In the closing state, only the molding surface 82 out of the slide core 80 is exposed inside the cavity 51. The molding surface 82 becomes flat with another inner surface of the cavity 51 to be positioned nearby and forms the outline of the plug 20 as a whole.

The displacement mechanism 90 displaces the slide core 80 in the depth direction of the undercut. In closing, the displacement mechanism 90 displaces the molding surface 82 in the depth direction of the undercut to hold at that position. In opening, the displacement mechanism 90 displaces the molding surface 82 reversely in the depth direction of the undercut to remove the molding surface 82 from the wedge shape portion 25 (the undercut).

For this function, the displacement mechanism 90 has slant surfaces 91, 93 formed in the middle portion of the slide core 80; and abutting sections 92, 94 respectively formed on openings of the sleeve 81. The slant surface 91 is a cam shape surface to slidably contact the abutting section 92. The slant surface 93 is a cam shape surface to slidably contact the abutting section 94.

At the tip end portion of the slide core 80, a width of the undercut in the depth direction is substantially the same as a width of the sleeve 81 in the same direction so that, when the tip end portion of the slide core 80 is in the sleeve 81, the slide core 80 can be securely held near the abutting section 92 and does not displace in the depth direction (the state shown in FIG. 23).

When the slide core 80 is advanced in the cavity 51, an abutting position with the abutting section 92 is moved along the slant surface 91 into a state where the slide core 80 can be moved in the opposite direction of the depth direction of the undercut by a distance of the displacement of the slant surface 91 (the state shown in FIG. 24).

On the other hand, a base end side portion of the slide core 80 relative to the slant surface 93 has a larger size in the depth direction of the undercut. Accordingly, in an advancement of the slide core 80 in the cavity 51, when the slant surface 93 comes into contact with the abutting section 94, the slide core 80 is displaced in the opposite direction of the depth direction of the undercut due to the slant surface 93 (the state shown in FIG. 25).

Thus, the molding surface 82 can be displaced to be removed from the wedge shape portion 25 (the undercut) as stated above.

In the embodiment, following operations are conducted based on an injection molding method of the invention.

First, the fixed die 60 and the movable die 70 are closed. Then, the ejector pins 61 and the slide core 80 are retracted to prepare a predetermined outline shape for molding in the cavity 51 (the state shown in FIG. 23).

In this state, the molten resin is ejected in the cavity 51 and then cooled to solidify the resin to be the plug 20 (the molding article). At this time, the wedge shape portion 25 (the undercut) is formed in the plug 20 by the molding surface 82 of the slide core 80.

Next, the fixed die 60 and the movable die 70 are opened to advance the ejector pins 61 and the slide core 80, thereby removing the plug 20 from the fixed die 60.

However, the wedge shape portion 25 (the undercut) and the molding surface 82 of the slide core 80 are fitted with each other with the concaves and convexes in the depth direction of the undercut, so that the slide core 80 and the plug 20 cannot be separated in this state (the state shown in FIG. 24).

When the ejector pins 61 and the slide core 80 are further advanced, the slide core 80 is displaced in the opposite direction of the depth direction of the undercut by the displacement mechanism 90, thereby dissolving the concavely and convexly fitting state of the wedge shape portion 25 and the molding surface 82. Hence, the plug 20 can now be freely removed (the state shown in FIG. 25).

Following advantages can be obtained according to the embodiment.

Since the molding surface 82, which corresponds to the concave and convex shape of the undercut, is provided on the lateral surface of the slide core 80; and the displacement mechanism 90 displaces the slide core 80 in the opposite direction of the depth direction of the undercut, the wedge shape portion 25 (the undercut) can be molded by the molding surface 82; and the molding surface 82 can be separated from the undercut in the opening state so as not to interfere with the removal of the plug 20 (the molding article).

Since the slide core 80 and the displacement mechanism 90 is arranged such that the tip end portion of the slide core 80 does not move in the closing state, injection pressure of the molten resin can be reliably received and the molding can be precise.

Since the slide core 80 are displaced in the depth direction of the undercut by the displacement mechanism 90, the advancement direction of the slide core 80 is not limited to the depth direction of the undercut. Hence, the slide core 80 can be also driven for advancement and retraction by the drive mechanism of the ejector pins 61, thereby simplifying the structure and driving control thereof.

Owing to the flexibility in direction described above, even when the molding article such as the plug 20 of the embodiment has a surface facing the undercut (the plug body 21 faces the wedge shape portion 25), displacement by the displacement mechanism can be made, so that the slide core 80 and the advancement/retraction direction thereof can be freely arranged.

Since the slide core 80 is arranged to advance/retract in the closing direction of the fixed die 60 and the movable die 70, the slide core 80 can be synchronously operated with the ejector pins 61 that are usually disposed in the closing direction, thereby facilitating diversion of the drive mechanism of the ejector pins 61.

Since the displacement mechanism 90 has a cam-like portion using the abutting sections 92, 94 of the guide sleeve 81 and the slant surfaces 91, 93 of the slide core 80, the slide core 80 can be smoothly displaced while utilizing the advancing/retracting movement thereof, thereby simplifying the displacement mechanism and driving control thereof.

The scope of the present invention is not restricted to the above-described embodiments, but includes modifications and improvements as long as an object of the present invention can be achieved.

For example, the ejector pins 61, the slide core 80 and the displacement mechanism 90 are set on the fixed die 60 side in the embodiment, but the invention is not limited to this arrangement.

The ejector pins 61, the slide core 80 and the displacement mechanism 90 may be set to the movable die 70. However, the drive mechanism may be preferably set on the fixed die side.

The advancement/retraction of the slide core 80 may not share the drive mechanism with the ejector mechanism, but may share with a die-closing mechanism or may have own drive mechanism such as a dedicated motor, a solenoid and a hydraulic cylinder.

The ejector pins 61 and the slide core 80 may not move in the same direction, and the slide core 80 may be preferably disposed at an appropriate position in accordance with the position of the undercut. In this case, it is difficult to share the drive mechanism. Still, sharing of the drive mechanism can be possible by employing, for example, an appropriate link mechanism, even when the directions or the positions of the ejector pins 61 and the slide core 80 are different.

The displacement mechanism 90 may not have the above described cam shape with the abutting sections 92, 94 of the guide sleeve 81 and the slant surfaces 91 93 of the slide core 80. Another lock mechanism or the like may be employed for position controlling in the closing state, so that at least the abutting section 94 and the slant surface 93 need to have a cam shape for appropriate displacement.

The displacement mechanism 90 may displace the slide core 80 together with the guide sleeve 81 by an independent drive mechanism without limiting the cam shape formed in the slide core 80.

In the embodiment, the plug 20 for the buckle is explained as an example of the molding article, but the present invention can be applied to a variety of moldings having an undercut.

The priority applications Numbers JP2005-22175, JP2005-51555, and JP2005-111115 upon which this patent application is based is hereby incorporated by reference.

What is claimed is:

1. A side-release buckle, comprising:
a plug;
a socket;
a lock mechanism for maintaining the plug and the socket in engagement in a releasable manner; and
a pair of lock arms provided on the plug, wherein
the lock mechanism comprises an arm-side lock member formed on the pair of lock arms and a socket-side lock member formed on the socket,
at least one of the arm-side lock member and the socket-side lock member has a slant surface to contact the other, and
the slant surface is slanted so as to extend from a rear side toward a front side of the buckle as extending from an upper surface side toward a rear surface side of the buckle and is slanted from the rear side toward the front side of the buckle as extending from an outer side to an inner side of the buckle.

2. The buckle according to claim 1, wherein the plug and the socket respectively have an attachment for holding a tape object.

3. The buckle according to claim 1, wherein
the plug has an attachment holding a tape object, and
the socket has an attachment fixed on a surface of another article.

4. A side-release buckle, comprising:
a plug;
a socket, the plug and the socket being engaged in a predetermined engagement direction; and
a lock mechanism for maintaining the plug and the socket in engagement in a releasable manner, wherein
the plug and the socket have a first direction orthogonal to the engagement direction and a second direction orthogonal to both of the engagement direction and the first direction,
the socket has an insertion opening and a cavity extending from the insertion opening toward inside of the socket,
the plug has a pair of lock arms extending in the engagement direction, the pair of lock arms opposing in the first direction,
the lock mechanism has an arm-side lock member formed on each lock arm and a socket-side lock member formed on the socket,
at least one of the arm-side lock member and the socket-side lock member is a slant surface contactable with the other,
the slant surface has a back side in the engagement direction continuous with an outer surface of the socket and a front side in the engagement direction positioned inside the socket, the slant surface being slanted relative to the engagement direction, the first direction, and the second direction,
the slant of the slant surface being formed such that a tip end in the engagement direction is disposed inside the socket.

5. The buckle according to claim 4, wherein the slant surface is formed on the socket-side lock member, a front periphery of the slant surface in the engagement direction having an inner portion and an outer portion on the socket, the inner portion being positioned forward in the engagement direction relative to the outer portion.

6. The buckle according to claim 4, wherein the slant surface is formed on the arm-side lock member, a rear periphery of the slant surface in the engagement direction having an inner portion and an outer portion on the plug, the inner portion being positioned forward in the engagement direction relative to the outer portion.

7. The buckle according to claim 4, wherein
the socket has an operation opening,
the socket-side lock member is formed on a peripheral of the operation opening, each of the lock arms has near a tip end thereof an operating section to be exposed through the operation opening, and the operating section has a step face on a plug side, the step face forming the arm-side lock member.

8. The buckle according to claim 7, wherein the socket and the plug respectively have a front surface and a rear surface opposing in the second direction and a pair of lateral surfaces opposing in the first direction, the socket has the operation opening on the lateral surfaces and the operation opening extending in to the front surface, and each of the lock arms has an operating section exposed through the operation opening, the operating section being operable from the outside in the first direction to be close to an other lock arm and in the second direction from the front surface to the rear surface.

9. The buckle according to claim 4, wherein the plug and the socket respectively have an attachment for holding a tape object.

10. The buckle according to claim 4, wherein the plug has an attachment holding a tape object, and the socket has an attachment fixed on a surface of another article.

11. A buckle, comprising:

a plug; and a socket having a front side and a rear side, the plug and the socket being engageable with and releasable from each other, wherein the plug has a guide bar to be inserted in the socket, and the guide bar has an abutting section to be in slidable contact with the socket and a non-abutting section not to be in slidable contact with the socket, the abutting section being a to-be-held section and a sub to-be-held section that are formed on the guide bar, the non-abutting section being a dent formed between the to-be-held section and the sub to-be-held section, the plug has an attachment for holding a tape object, the socket has an attachment to be fixed on a surface of another article, and the guide bar has a substantially flat side near the front side, and the dent is provided on a side near the rear side, the dent extending the width of the guide bar, and the dent preventing interference with the rear side of the socket when the guide bar is slidably engaged within the socket.

12. The buckle according to claim 11, wherein the socket has a holding section that sandwiches and holds the to-be-held section and a sub holding section that sandwiches and holds the sub to-be-held section.

13. The buckle according to claim 11, wherein the socket has a cavity provided inside the socket and an operation opening in communication with the cavity, the plug has a pair of lock arms that can be inserted in the cavity to be partially exposed through the operation opening and engaged with an engaging section of the operation opening, each of the lock arms being unlockable through the engaging section by being pressed aslant downward through the operation opening.

14. The buckle according to claim 13, wherein, when the plug is inserted in the socket, the guide bar contacts the cavity at a contact point near an opening section of the cavity, and the plug is moved along an axial direction thereof simultaneously with moving toward a front surface of the socket.

15. The buckle according to claim 13, wherein, when the plug is inserted in the socket, the guide bar contacts the cavity at a contact point inside the cavity and the contact point near the opening section of the cavity, and the plug is moved along the axial direction thereof simultaneously with moving toward the front surface of the socket.

16. The buckle according to claim 11, wherein the plug and the socket respectively have an attachment for holding a tape object.

* * * * *